(12) United States Patent
Inoue et al.

(10) Patent No.: US 7,691,781 B2
(45) Date of Patent: Apr. 6, 2010

(54) LAYERED POROUS TITANIUM OXIDE, PROCESS FOR PRODUCING THE SAME, AND CATALYST COMPRISING THE SAME

(75) Inventors: Shinichi Inoue, Yokohama (JP); Akihiro Mutou, Zushi (JP); Yukitaka Wada, Yokohama (JP); Hidehiko Kudou, Yokohama (JP); Tateo Ono, Kawasaki (JP); Hisashi Nomura, Yokohama (JP)

(73) Assignee: Chiyoda Corporation, Yokohama-shi (JP)

( * ) Notice: Subject to any disclaimer, the term of this patent is extended or adjusted under 35 U.S.C. 154(b) by 720 days.

(21) Appl. No.: 10/584,453

(22) PCT Filed: Dec. 25, 2003

(86) PCT No.: PCT/JP03/16746

§ 371 (c)(1),
(2), (4) Date: Jun. 22, 2006

(87) PCT Pub. No.: WO2005/063618

PCT Pub. Date: Jul. 14, 2005

(65) Prior Publication Data

US 2007/0140952 A1 Jun. 21, 2007

(51) Int. Cl.
*B01J 23/00* (2006.01)
*C01G 23/047* (2006.01)
(52) U.S. Cl. .................. 502/350; 502/351; 502/300; 423/610; 423/612; 423/615
(58) Field of Classification Search ............... 502/351, 502/350, 349; 423/592, 598, 610, 612, 615, 423/616
See application file for complete search history.

(56) References Cited

U.S. PATENT DOCUMENTS

| | | | | |
|---|---|---|---|---|
| 3,264,227 | A | * | 8/1966 | Cramer et al. ............... 502/11 |
| 4,248,852 | A | * | 2/1981 | Wakabayashi et al. ....... 423/626 |
| 4,422,960 | A | * | 12/1983 | Shiroto et al. ............... 502/206 |
| 4,851,293 | A | | 7/1989 | Egerton et al. |
| 5,021,392 | A | * | 6/1991 | Daly et al. .................. 502/439 |
| 5,147,629 | A | | 9/1992 | Robb et al. |
| 5,633,081 | A | * | 5/1997 | Clough et al. ............... 428/331 |
| 2004/0238410 | A1 | * | 12/2004 | Inoue et al. .................. 208/213 |

FOREIGN PATENT DOCUMENTS

| | | |
|---|---|---|
| JP | 56-120508 A | 9/1981 |
| JP | 63-274663 A | 11/1988 |
| JP | 5-246717 A | 9/1993 |
| JP | 11-290692 A | 10/1999 |
| JP | 2001-170500 A | 6/2001 |
| JP | 2002-28485 A | 1/2002 |
| JP | 2003-286011 A | 10/2003 |
| KR | 2001091498 | * 10/2001 |
| WO | WO 03/011762 | * 2/2003 |

OTHER PUBLICATIONS

Ryu et al., Deposition of Titania Nanoparticles on Spherical Silica, Jan. 2003, Journal of Sol-Gel Science and Technology, 26, pp. 489-493.*
English language translation of JP 56-40432-A.
English language abstract of JP 2003-040689 (Feb. 13, 2003).
English language abstract of JP 2003-201120 (Jul. 15, 2003).
English language abstract of JP 03-275143 (Dec. 5, 1991).
English language abstract of JP 06-106061 (Apr. 19, 1994).
Sugawa et al., PPM, (1992).
English language abstract of JP 05-096161 (Apr. 20, 1993).
English language abstract of JP 05-192575 (Aug. 3, 1993).
English language abstract of JP 2000-135440 (May 16, 2000).
English language abstract of JP 2001-009279 (Jan. 16, 2001).
English language abstract of JP 10-118495 (May 12, 1998).
English language abstract of JP 03-131340 (Jun. 4, 1991).
English language abstract of JP 05-184921 (Jul. 27, 1993).
Kumar et al., Materials Letters, vol. 43, pp. 286-290, (2000).
Toba et al., J. Mater. Chem., vol. 4, No. 4, pp. 585-589, (1994).
English language translation of JP 54-19491 (Feb. 14, 1979).
English language abstract of JP 2002-085975 (Mar. 26, 2002).
Luo et al., Mat. Res. Soc. Symp. Proc., vol. 346, pp. 445-450, (1994).

* cited by examiner

*Primary Examiner*—Jerry Lorengo
*Assistant Examiner*—Jared Wood
(74) *Attorney, Agent, or Firm*—Birch, Stewart, Kolasch & Birch, LLP

(57) ABSTRACT

This invention provides layered porous titanium oxide comprising an inorganic oxide as a core and titanium oxide deposited on the surface of the inorganic oxide, wherein the titanium localization index B/A represented by the ratio of the proportion of titanium (Ti) to the sum of the constituent metal (M) of the inorganic oxide and titanium (Ti) determined by X-ray photoelectron spectroscopy (XPS) [B=Ti $_{XPS}$/(Ti $_{XPS}$+M $_{XPS}$)] to the bulk mixing molar ratio of titanium (Ti) to the sum of the constituent metal (M) of the inorganic oxide and titanium (Ti) [A=Ti/(Ti+M)] is 1.6 or more and the titanium oxide is deposited on the surface of the inorganic oxide so as to be chemically and/or microscopically united to the inorganic oxide and also provides a process for producing the same and a catalyst comprising the same. The layered porous titanium oxide of this invention has a regulated pore structure, a large specific surface area, and excellent mechanical strength and is useful as a catalyst or a catalyst carrier.

18 Claims, 14 Drawing Sheets

LAYERED POROUS TITANIUM OXIDE, PROCESS FOR PRODUCING THE SAME, AND CATALYST COMPRISING THE SAME

FIELD OF TECHNOLOGY

This invention relates to porous titanium oxide which is useful as a catalyst or a catalyst carrier, a process for producing the same, and a catalyst comprising the same and, more particularly, this invention relates to layered porous titanium oxide which is prepared by using an inorganic oxide as a core and depositing titanium oxide on the surface of the inorganic oxide, a process for producing the same, and a catalyst comprising the same.

BACKGROUND TECHNOLOGY

Titanium oxide (titania) has better properties than alumina in respect to hydrogenation ability, corrosion resistance, photooxidation ability, and the like and, for this reason, it is attracting attention as a high-performance catalyst material not only in the areas of hydrorefining of petroleum fractions and denitrification of waste gas but also recently in the area of photocatalysts. However, titanium oxide obtained by the conventional synthetic methods has a relatively small specific surface area and it is difficult to provide such titanium oxide with a pore structure suitable for given reactants. In addition to these problems, titanium oxide is inferior to alumina in mechanical strength.

Now, the pore structure, specific surface area, and mechanical strength of porous titanium oxide are decided by an aggregate of primary and secondary particles of titanium oxide and an article molded from such an aggregate is normally used as a catalyst or a catalyst carrier. The pore structure suitable for the reactants can be controlled by performing the pH swing operation and the specific surface area can be increased by adding a particle growth inhibitor, although not quite to a level as high as that of alumina or silica (JP 2003-40,689 A).

However, the mechanical strength of titanium oxide which occurs as spherical particles is generally lower than that of alumina which occurs as needle-shaped and/or column-shaped particles. Hence, an attempt has been made to raise the mechanical strength of titanium oxide by partially incorporating minute particles in ordinary particles (JP 2003-201,120 A); however, it is difficult to obtain mechanical strength suitable for use in general commercial catalysts even by this technique and, besides, the specific surface area of titanium oxide obtained in this manner cannot be said to be satisfactory.

Another method proposed in an attempt to increase the specific surface area comprises depositing titanium oxide and the like on the surface of a molded article of porous alumina by the chemical vapor deposition (CVD) technique [JP 3-275,143 A, JP 6-106,061 A, and "PPM," September, 1992, published by The Nikkan Kogyo Shinbun Ltd.]. However, this technique deposits titanium oxide inside the fixed alumina pores and causes the following problem: the presence of anatase is confirmed by X-ray diffraction when the amount of deposited titanium oxide exceeds 13% and titanium oxide is induced to agglomerate to broaden the pore diameter distribution and decrease the number of effective pores most suitable to the target reactants. Furthermore, deposited titanium oxide blocks the alumina pores in some cases and this makes it difficult to deposit the desired catalyst metal in the ensuing step. Still further, when production on a commercial scale is contemplated, hydrogen chloride (HCl) forms inevitably from the reaction of titanium tetrachloride ($TiCl_4$) with water ($H_2O$) and this makes it necessary to devise some measures to prevent environmental pollution by hydrogen chloride.

To solve the aforementioned problems relating to titanium oxide, the following methods have been disclosed: molding of titanium oxide by the use of alumina, silica, silica/alumina, and the like as a binder and the use of a composite compound formed by co-precipitating titanium and the foregoing compounds as a catalyst carrier (JP 5-96,161 A, JP 5-192,575 A, JP 2000-135,440 A, JP 2001-9,279 A, and JP 10-118,495 A); the use of a composite oxide obtained by mixing gels as a catalyst carrier (JP 3-131,340 A and JP 5-184,921 A); and a sol-gel method [Materials Letters, 43, pp. 286-290 (2000) and J. Mater. Chem., (1994) 4 (4), pp. 585-589].

However, these techniques incur the possibility of producing the following undesirable effects: titanium oxide deteriorates in purity and becomes a substance merely showing an intermediate performance of titanium oxide and other substances and a composite effect due to substances other than titanium oxide promotes side reactions thereby lowering the selectivity of the reactants and accelerating deterioration of the catalyst.

Furthermore, a method for using a carrier obtained by depositing an aqueous titania solution on an alumina hydrogel followed by calcining is disclosed [JP 54-19,491 A, JP 2002-85,975 A, Symposium on Better Ceramics Through Chemistry ($6^{th}$) 1994, pp. 445-450]. However, this technique merely deposits an aqueous solution of a mineral acid salt of titanium on an alumina hydrogel and, as a result, deposited titanium oxide assumes the anatase structure when analyzed by X-ray diffraction and is not chemically and/or microscopically united to the alumina. An agglomerate or an aggregate of titanium oxide forms partially and it is difficult to deposit titanium oxide over the whole surface of the alumina hydrogel.

Under the circumstances, the inventors of this invention have devoted every effort to develop porous titanium oxide which has a regulated pore structure, a large specific surface area, and excellent mechanical strength, found that layered porous titanium oxide which has a regulated pore structure, a large specific surface area, and excellent mechanical strength can be obtained by depositing titanium oxide on the surface of an inorganic oxide having a regulated pore structure and serving as a core while unevenly distributing titanium oxide on the surface of the inorganic oxide in conformity to a prescribed titanium localization index and maintaining the pore structure of the inorganic oxide, and completed this invention.

Accordingly, this invention provides layered porous titanium oxide which has a regulated pore structure, a large specific surface area, and excellent mechanical strength and is useful as a catalyst by itself or as a catalyst carrier.

Moreover, this invention provides a process for producing layered porous titanium oxide which has a regulated pore structure, a large specific surface area, and excellent mechanical strength and is useful as a catalyst by itself or as a catalyst carrier.

Still further, this invention provides a catalyst comprising layered porous titanium oxide which has a regulated pore structure, a large specific surface area, and excellent mechanical strength and useful as a catalyst for hydrorefining, hydrogenation of CO, denitrification of waste gas, photocatalysis, and the like.

DISCLOSURE OF THE INVENTION

Accordingly, this invention relates to layered porous titanium oxide comprising an inorganic oxide as a core and titanium oxide deposited on the surface of the inorganic oxide wherein the titanium localization index B/A represented by the ratio of the proportion of titanium (Ti) to the sum of the constituent metal (M) of the inorganic oxide and titanium (Ti) determined by X-ray photoelectron spectroscopy (XPS) [B=Ti xps/(Ti xps+M xps)] to the bulk mixing molar ratio of titanium (Ti) to the sum of the constituent metal (M) of the inorganic oxide and titanium (Ti) [A=Ti/(Ti+M)] is 1.6 or more and the titanium oxide is deposited on the surface of the inorganic oxide so as to be chemically and/or microscopically united to the inorganic oxide.

Further, this invention relates to a process for producing layered porous titanium oxide comprising an inorganic oxide as a core and titanium oxide deposited on the surface of the inorganic oxide and the process contains a depositing step which comprises supplying a raw material titanium solution and a pH adjusting agent in the presence of an inorganic oxide and depositing titanium oxide on the surface of the inorganic oxide in the pH range between the isoelectric point of titanium oxide and that of the inorganic oxide.

Still further, this invention relates to a catalyst such as a photocatalyst comprising layered porous titanium oxide calcined or uncalcined after the aforementioned depositing step and this invention also relates to a catalyst comprising layered porous titanium oxide calcined or uncalcined after the depositing step as a carrier and a catalyst metal deposited on the carrier, typically for hydrorefining, hydrogenation of CO, and denitrification of waste gas.

Although titanium oxide shows high catalytic activity, the layered porous titanium oxide of this invention does not show the crystal structure of titanium oxide by X-ray diffraction. That is, titanium oxide is deposited on the surface of the inorganic oxide so as to be chemically and/or microscopically united to the inorganic oxide and this makes it possible to extract high catalytic activity inherent in titanium oxide without spoiling it.

Here, "chemically and/or microscopically united" refers to the condition where titanium oxide deposited on the surface of the inorganic oxide is not merely in physical contact with the surface of the inorganic oxide as in the case of agglomeration or mixing, but forms a strong chemical bond with the surface of the inorganic oxide or forms a bond with the inorganic oxide as extremely minute crystals while enveloping the surface of the inorganic oxide so as to be united to the inorganic oxide. The layered porous titanium oxide in this condition shows high catalytic activity of titanium oxide itself without being influenced by the chemical properties of the inorganic oxide core. It goes without saying that the layered porous titanium oxide of this invention may partly contain titanium oxide which is not chemically and/or microscopically united to the inorganic oxide core.

The layered porous titanium oxide of this invention is free from the following undesirable phenomena: the performance degrades to the level of an intermediate between the inorganic oxide and titanium oxide and a composite effect of the inorganic oxide promotes side reactions thereby lowering the selectivity of the reactants and deteriorating the catalyst. In any of the conventional composite oxides of an inorganic oxide of a different kind and titanium oxide (prepared by the use of an inorganic oxide of a different kind as a binder or by coprecipitation with an inorganic oxide of a different kind), the inorganic oxide of a different kind in question becomes exposed partially on the surface of the composite oxide and displays its own characteristic properties as well. In contrast, the layered porous titanium oxide of this invention produces the aforementioned effect probably for the following reason: deposited titanium oxide exists as one body on the surface of the inorganic oxide or, unlike the formation of a composite by vapor deposition inside fixed pores, titanium oxide is deposited on the surface of minute particles, such as primary particles, of the inorganic oxide and this makes it possible to increase sharply the amount of deposited titanium oxide; thus, titanium oxide occupies the whole exposed surface of the inorganic oxide and exclusively manifests its own properties.

Moreover, the physical characteristics inherent in the inorganic oxide are reflected in the layered porous titanium oxide of this invention. As described above, titanium oxide synthesized by the conventional method has the following problems; it normally has a relatively small specific surface area, it scarcely has a regulated pore structure in respect to pore volume, pore distribution, and the like, and it has relatively low mechanical strength. However, by the use of alumina that has a large specific surface area, a large pore volume, a pore distribution suitable to the reactants, and high mechanical strength as a core, the layered porous titanium oxide of this invention exhibits the chemical characteristics of titanium oxide existing on the surface, and yet it has a large specific surface area, a regulated pore structure, and excellent mechanical strength reflecting the physical characteristics of the alumina core; thus, it exhibits excellent characteristics as a catalyst or catalyst carrier.

An example of the "chemically and/or microscopically united" condition is the repeat distance between the crystal lattice planes of titanium oxide on the surface of the aforementioned inorganic oxide; it is 50 Å or less, preferably 40 Å or less, more preferably 20 Å or less. Generally, when a substance with a small repeat distance between the crystal lattice planes such as this is measured by an X-ray diffractometer, the diffraction lines of this substance overlap other diffraction lines and the limit of measurement is reached.

Therefore, there are instances where the main peak of titanium oxide (anatase) $2\theta=26.5°$ is not detected in attempts to measure the surface of the layered porous titanium oxide of this invention by an ordinary X-ray diffractometer. Conversely, the existence of layered porous titanium oxide is indicated in the case where the main peak $2\theta=26.5°$ of titanium oxide is not detected by an ordinary X-ray diffractometer in spite of the proven existence of titanium oxide on the surface of the inorganic oxide. Naturally, this does not necessarily mean that the main peak $2\theta=26.5°$ of titanium oxide is not detected in all the specimens of the layered porous titanium oxide of this invention by an ordinary X-ray diffractometer.

Another example of the "chemically and/or microscopically united" condition is an inability to clearly distinguish the particles of the inorganic oxide from those of titanium oxide in a high-magnification image (for example, 2,000,000-fold magnification) of a transmission electron microscope (TEM) (hereinafter referred to simply as "TEM image"). When the inorganic oxide and titanium oxide exist as separate things chemically and microscopically, they ought to be recognized individually on the basis of the spacing of crystal lattice planes in the TEM image; however, they could not be recognized individually if they were chemically united or titanium oxide were deposited as extremely minute crystals on the inorganic oxide.

Therefore, in the case where the particles of the inorganic oxide cannot be distinguished clearly from those of titanium oxide on the basis of the spacing of crystal lattice faces in the image of an ordinary TEM in spite of the proven existence of titanium oxide on the surface of the inorganic oxide, the specimen in question is concluded to be the layered porous titanium oxide of this invention. Naturally, this does not necessarily mean that the particles of the inorganic oxide cannot be distinguished clearly from those of titanium oxide in the TEM images of all the specimens of the layered porous titanium oxide of this invention.

The layered porous titanium oxide of this invention, the process for producing the same, and a catalyst comprising the same are described item by item in detail below.

[Inorganic Oxides]

According to this invention, an inorganic oxide to serve as a core is not restricted specifically as long as it can support titanium oxide on its surface; it may also be a compound in the condition where a large amount of hydroxyl groups, for example, a hydrosol, a hydrogel, a xerogel and a compound generally called a hydroxide or hydrated oxide. Concretely, the candidate inorganic oxide is preferably at least one selected from the group of alumina, silica, magnesia, silica/alumina, silica/titania, alumina/zirconia, silica/zirconia, and silica/magnesia. Alumina, silica, and silica/alumina are particularly desirable. Alumina and silica having a regulated pore structure, a relatively large specific surface area, and excellent mechanical strength are readily available and they help to produce layered porous titanium oxide having excellent properties in the end.

The aforementioned inorganic oxide can be used in any shape as there is no specific restriction on the shape, but a needle-shaped or column-shaped material is preferred because a material of this particular shape allows control of the pore structure in a wide range and helps to obtain a product having a relatively large specific surface area and excellent mechanical strength. It is not meaningful here to distinguish clearly a needle-shaped inorganic oxide from a column-shaped one and, supposing the shape of an inorganic oxide is expressed in terms of aspect ratio (length/width), a needle-shaped or column-shaped inorganic oxide shows preferably an aspect ratio of 5 or more, more preferably 10 or more.

It is preferable to synthesize an inorganic oxide by the pH swing operation. This operation enables the production of an inorganic oxide in porous and homogeneous particles of the desired shape (for example, alumina in the shape of needle). Moreover, it is possible to produce easily an inorganic oxide having a regulated pore structure and the desired physical properties by controlling the conditions of the pH swing operation.

The "pH swing operation" in this invention means an operation for synthesizing an inorganic oxide which comprises changing the pH of the synthetic solution of an inorganic oxide between the acidic side and the alkaline side thereby swinging the inorganic oxide between the dissolution range and the precipitation range and letting the particles grow uniformly to the target diameter. According to this pH swing operation, an inorganic oxide can be produced in particles having the desired pore structure and specific surface area by properly controlling a variety of conditions such as number of swings, temperature for synthesis, pH on the acidic and alkaline sides and its retention time, concentration of raw materials, and use of additives such as a particle growth inhibitor. Therefore, the conditions for the synthesis of a particular inorganic oxide by the pH swing operation are not restricted and they are selected so as to serve the purpose.

The synthesis of inorganic oxides by the pH swing operation, for example, the synthesis of alumina is described in detail in JP 1-16,773 B, JP 2-56,283 B, an article in "Ceramics" (in Japanese), No. 4, 1998, and JP 2002-97,010 A. The synthesis of other inorganic oxides is described in JP 56-120,508 A (magnesium, boron, aluminum, silicon, titanium, zirconium, and silica/magnesia), JP 56-115,638 A (alumina, silica, titania, boria, zirconia, silica/alumina, silica/magnesia, and the like), and elsewhere.

[Titanium Oxide]

According to this invention, no restriction except the one on the surface condition to be described later is imposed on titanium oxide to be deposited on the surface of the aforementioned inorganic oxide. Titanium oxide generally assumes a roughly spherical shape and it may be in this shape in this invention or, when titanium oxide is chemically and/or microscopically united to the inorganic oxide, it may be in another shape or in a condition where the shape cannot be confirmed.

In the layered porous titanium oxide of this invention, the titanium localization index (B/A) is required to be 1.6 or more, preferably 2.0 or more, wherein B is the proportion of titanium (Ti) to the sum of the constituent metal (M) of the inorganic oxide and titanium (Ti) determined by X-ray photoelectron spectroscopy (XPS) or B=Ti xps/(Ti xps+M xps) and A is the bulk mixing molar ratio of titanium (Ti) to the sum of the constituent metal (M) of the inorganic oxide and titanium (Ti) or A=Ti/(Ti+M). Here, the quantity B determined by XPS shows the proportion of titanium oxide existing in the vicinity of the surface of layered porous titanium oxide while the bulk mixing molar ratio A shows the proportion of titanium oxide existing in layered porous titanium oxide as a whole. In consequence, the aforementioned titanium localization index (B/A) indicates the extent of localization of titanium oxide near the surface when titanium oxide is deposited on the surface of the inorganic oxide core. The greater the titanium localization index, the more titanium oxide exists near the surface of the inorganic oxide. When the titanium localization index (B/A) becomes less than 1.6, the inorganic oxide is not covered completely, becomes partly exposed, and displays its properties in the exposed parts when the content of titanium is low; then it becomes difficult for titanium oxide to manifest its own surface activity and the chemical characteristics of titanium oxide deteriorate. When the content of titanium is high, titanium oxide undergoes bonding or crystallization by itself and, as a result, the specific surface area of layered titanium oxide decreases and, further, so does the mechanical strength.

The aforementioned quantity B is determined by XPS under the following conditions.

X-ray source: MgKα (excitation energy, 1253.6 eV)
Applied voltage: 10 KV
Emission current: 20 mA
Pass energy: 50 eV
Photoelectron takeout angle: 90°
Sputtering: none The proportion of deposited titanium oxide (content of titanium oxide) in layered porous titanium oxide as a whole is normally from 13 mass % to 60 mass %, preferably from 15 mass % to 50 mass %, more preferably from 20 mass % to 45 mass %. When the content of titanium oxide is less than 13 mass %, the inorganic oxide is not covered completely, becomes exposed in part, and displays its properties in the exposed parts and this makes it difficult for titanium oxide alone to manifest its surface activity. Conversely, when the content of titanium oxide exceeds 60 mass %, titanium oxide itself undergoes bonding and layered titanium oxide deteriorates in specific surface area and also in mechanical strength.

[Condition of Surface]

In the layered porous titanium oxide of this invention, the porous structure is conceivably constituted of the pore structure possessed by the inorganic oxide serving as a core and of the gaps between the crystals of titanium oxide deposited on the surface of the inorganic oxide. As the crystals of titanium oxide are extremely minute, the pore structure of layered porous titanium oxide is decided mainly by the pore structure of the inorganic oxide. Hence, if the inorganic oxide core had a relatively large specific surface area and a regulated pore structure, this surface condition could be reflected in layered porous titanium oxide. That is, in case titanium oxide which occurs as uniform spherical particles is used alone, the specific surface area is decided by the particle size. However, in this invention, the surface condition of the inorganic oxide is reflected almost as it is.

In the layered porous titanium oxide of this invention, the pore sharpness degree is 50% or more, preferably 60% or more, more preferably 70% or more, the pore volume is 0.3 mL/g or more, preferably 0.4 mL/g or more, and the specific surface area is 100 $m^2$/g or more, preferably 130 $m^2$/g or more, more preferably 150 $m^2$/g or more. When the pore sharpness degree is below 50%, the proportion of pores effective for the reaction decreases and the catalytic activity drops. When the pore volume is less than 0.3 mL/g, a catalyst metal occupies pores and no more catalyst metal can be deposited. Moreover, when the specific surface area is less than 100 $m^2$/g, the activity per unit surface area may be high, but the actual activity level drops because the catalytic performance is decided by the total surface area available to the reaction site.

The "pore sharpness degree" here prescribes the range of optimal pore diameter. This factor is obtained by measuring the pore diameter (median diameter) at 50% of the total pore volume, then determining the pore volume (PVM) in the range of pore diameter corresponding to ±5% of the logarithmic value of the median diameter, and calculating the pore sharpness degree from the pore volume (PVM) and the total pore volume (PVT) as follows;

pore sharpness degree (%)=(PVM/PVT)×100.

This means that the diameter of pores becomes increasingly more uniform as the pore sharpness degree gets nearer 100%. The pore sharpness degree can be calculated, for example, from the accumulated pore distribution curve determined by mercury intrusion porosimetry by using the aforementioned equation.

The "pore volume" is the value obtained by dividing the sum of the volume (S) of each pore in layered porous titanium oxide or ΣS by the mass (m) of layered porous titanium oxide or it is ΣS/m. The pore volume can be determined by mercury intrusion porosimetry or the nitrogen adsorption technique.

Moreover, the specific surface area can be determined, for example, by mercury intrusion porosimetry or the nitrogen adsorption technique.

[Process of Production]

The process of this invention for producing layered porous titanium oxide (hereinafter simply referred to as "the process of this invention") is used to produce the aforementioned layered porous titanium oxide of this invention and it contains the aforementioned depositing step which comprises supplying a raw material titanium solution and a pH adjusting agent in the presence of an inorganic oxide and depositing titanium oxide on the surface of the inorganic oxide in the pH range between the isoelectric point of titanium oxide and that of the inorganic oxide. The process of this invention may include a pH swing step for preparing a dispersion containing the aforementioned inorganic oxide by the pH swing operation before the depositing step or it may include a calcining step at a temperature in the range of 90-900° C. after the depositing step.

The process of this invention can produce layered porous titanium oxide in which titanium oxide of high catalytic activity is deposited on the surface of the inorganic oxide so as to be chemically and/or microscopically united to the inorganic oxide in a simple manner at low cost.

[pH Swing Step]

The pH swing step here is a step for producing one of raw materials or the aforementioned inorganic oxide by the pH swing operation and has already been described in the section entitled [inorganic oxides]. A dispersion containing the inorganic oxide is prepared in the pH swing step and, according to the process of this invention, the dispersion is supplied as it is to the depositing step.

[Depositing Step]

According to the process of this invention, the depositing step constitutes an essential step wherein a raw material titanium solution and a pH adjusting agent is supplied in the presence of an inorganic oxide and titanium oxide is deposited and layered on the surface of the inorganic oxide in the pH range between the isoelectric point of titanium oxide and that of the inorganic oxide.

The isoelectric point of an inorganic oxide or titanium oxide is a specific property of the substance in question and the electric charge on the surface of the particles of a given substance drifting in a liquid changes its sign from positive to negative or vice versa as the pH crosses the boundary which is the isoelectric point. To be more concrete, the surface of the particles drifting in a liquid is charged negatively on the alkaline side and positively on the acidic side with the isoelectric point constituting the boundary. In the aforementioned pH swing operation, the crystals repeat growth and partial dissolution every time the pH changes across the isoelectric point and grow homogeneous in the end.

According to the process of this invention for producing layered porous titanium oxide, a raw material titanium solution and a pH adjusting agent are supplied and titanium oxide is deposited on the surface of the inorganic oxide in the pH range between the isoelectric point of titanium oxide and that of the inorganic oxide. By adjusting the pH range in this manner, the electric charge on the surface of the inorganic oxide becomes the reverse of the electric charge on the surface of titanium oxide, titanium oxide is attracted strongly to the surface of the inorganic oxide and the two are presumably chemically and/or microscopically united together.

The isoelectric points of titanium oxide and some other inorganic oxides are listed in Table 1. The isoelectric point of a mixture such as silicaltitania and alumina/zirconia lies somewhere between the isoelectric points of the components and assumes a value corresponding to the mix ratio.

TABLE 1

| Substance | Isoelectric point |
| --- | --- |
| Titanium Oxide | 6.0 |
| Alumina | 9.0 |
| Silica | 2.0 |
| Zirconia | 4.0 |
| Magnesia | 12.0 |

The case of alumina as an inorganic oxide is cited as an example. As the isoelectric point of titanium oxide is 6.0 and that of alumina is 9.0 in this case, a raw material titanium solution and a pH adjusting agent are supplied and the pH of the reaction solution is adjusted to a point between 6.0 and 9.0. Then, the pH on the surface of alumina is lower than the isoelectric point of alumina and the surface of alumina is charged positively. Conversely, the pH of the surface of titanium oxide is higher than the isoelectric point of titanium oxide and the surface of titanium oxide is charged negatively. As a result, titanium oxide is deposited satisfactorily on the surface of alumina.

The case of silica as an inorganic oxide is cited as another example. As the isoelectric point of silica is 2.0 in this case, a raw material titanium solution and a pH adjusting agent are supplied and the pH is adjusted to a point between 2.0 and 6.0. Then, the surface of titanium oxide is charged positively as the pH is lower than the isoelectric point of titanium oxide while the surface of silica is charged negatively as the pH is higher than the isoelectric point of silica and titanium oxide is deposited satisfactorily on the surface of silica.

The procedure to be followed in the depositing step is described concretely here.

First, a dispersion is prepared by dispersing an inorganic oxide in water. In the case where a dispersion has been prepared in the aforementioned pH swing step, the dispersion may be used as prepared. The concentration of the inorganic oxide at this moment is selected normally from the range of 5-200 g/L, preferably from the range of 10-100 g/L.

A raw material titanium solution and a pH adjusting agent are supplied to the dispersion and titanium oxide is deposited on the inorganic oxide in the target pH range or the pH of the dispersion is adjusted to a point in the target range by a pH adjusting agent in advance. The pH adjusting agents for adjusting the pH to a point on the acidic side include hydrochloric acid, nitric acid, sulfuric acid, carbonic acid, formic acid, and acetic acid and hydrochloric acid and nitric acid are preferred. The pH adjusting agents for adjusting the pH to a point on the alkaline side include sodium hydroxide, potassium hydroxide, ammonia water, sodium carbonate, potassium carbonate, sodium hydrogen carbonate, and potassium hydrogen carbonate and sodium hydroxide and ammonia water are preferred.

It is advantageous to add to the aforementioned dispersion a particle growth inhibitor containing at least one element selected from the group of silicon, phosphorus, magnesium, calcium, barium, manganese, aluminum, and zirconium. Addition of such a particle growth inhibitor improves the heat stability of titanium oxide so that titanium oxide remains minute, does not agglomerate even at high temperatures during calcining, and maintains its chemical and/or microscopical union with the inorganic oxide.

Examples of the particle growth inhibitors useful for the process of this invention are the following compounds: silicon tetrachloride, silicon dioxide, colloidal silica, silicic acid, silicates, phosphoric acid, ammonium hydrogen phosphate, magnesium nitrate, magnesium sulfate, magnesium carbonate, magnesium borate, calcium nitrate, calcium sulfate, calcium carbonate, calcium hydroxide, calcium chloride, barium nitrate, barium sulfate, zirconyl nitrate, zirconium oxychloride, zirconium sulfate, manganese nitrate, aluminum nitrate, and aluminum hydroxide. The amount of a pH adjusting agent to be added is decided properly by the conditions such as the kind of pH adjusting agent, the purpose, the kind of inorganic oxide, and the like and it is normally in the range of 0.1-3 mass % based on titanium oxide in use.

Next, a raw material titanium solution and a pH adjusting agent are added to the moderately agitated dispersion. A solution of titanium chloride is generally used as a raw material titanium solution, but a solution of titanium sulfate or titanyl sulfate may be used just as well. The concentration of the raw material titanium solution is not restricted, but it is selected from a rough range of 1-50 mass %.

On the other hand, a pH adjusting agent is suitably selected from the aforementioned pH adjusting agents for adjusting the pH to a point on the alkaline side, inclusive of the preferred ones. It is not necessary to select the same pH adjusting agent as used in the aforementioned adjustment of the pH of the dispersion; however, when the pH adjusting agent used is the one for adjusting the pH to a point on the alkaline side, the same one is preferably selected.

The temperature of the reaction solution in the depositing step is selected normally from the range of room temperature to 100° C., preferably from the range of 40-90° C., more preferably from the range of 50-70° C. The reaction time in the depositing step varies with the concentration, temperature, kind of inorganic oxide and raw material titanium solution, and the like and it is normally selected from the range of one minute to one hour, preferably from the range of 3-30 minutes.

The operation of the depositing step is completed as described above to give layered porous titanium oxide in which titanium oxide is deposited on the surface of the inorganic oxide. This product is separated from the solution, washed with water, molded, dried properly, and put to the intended use.

[Calcining Step]

The product layered porous titanium oxide is preferably subjected further to a calcining treatment. This treatment can be performed in an ordinary oven or in a rotary kiln. The calcining treatment is performed at a temperature in the range from 90° C. to 900° C., preferably in the range from 120° C. to 700° C., and for a period in the range from 30 minutes to 5 hours, preferably in the range from one hour to three hours. The calcining treatment removes water of crystallization and oxidatively decomposes impurities thereby promoting the deposition of the catalyst metal and raising the mechanical strength to a level suitable for commercial use.

[Uses]

The layered porous titanium oxide of this invention prepared as described above has a regulated pore structure, a large specific surface area, and excellent mechanical strength and it can be used as a catalyst carrier; catalysts comprising suitable catalyst metals deposited on layered porous titanium oxide can be used advantageously in a large number of applications, for example, hydrorefining, denitrification of waste gas, hydrogenation of CO, and the like.

The catalyst metals which can be deposited on the layered porous titanium oxide of this invention as a catalyst carrier include tungsten, molybdenum, cobalt, nickel, ruthenium, palladium, platinum, phosphorus, boron, and vanadium and a suitable combination of these catalyst metals can also be used. The method for depositing the catalyst metal is not restricted and any publicly known method can be adopted; for example, impregnation, ion exchange, and kneading. It is also possible to prepare a catalyst by depositing a catalyst metal on layered porous titanium oxide by an ion exchange method before the calcining step and then subjecting to the calcining steps.

Moreover, titanium oxide itself has a photocatalytic ability as displayed in photooxidative decomposition and photoinduced superhydrophilicity and the layered porous titanium oxide of this invention which has a regulated pore structure, a large specific surface area, and excellent mechanical strength can be used by itself as a photocatalyst of high catalytic activity in various fields such as deodorization, water treatment, antibacterial treatment, and prevention of fouling.

PREFERRED EMBODIMENTS OF THE INVENTION

Figure 1:
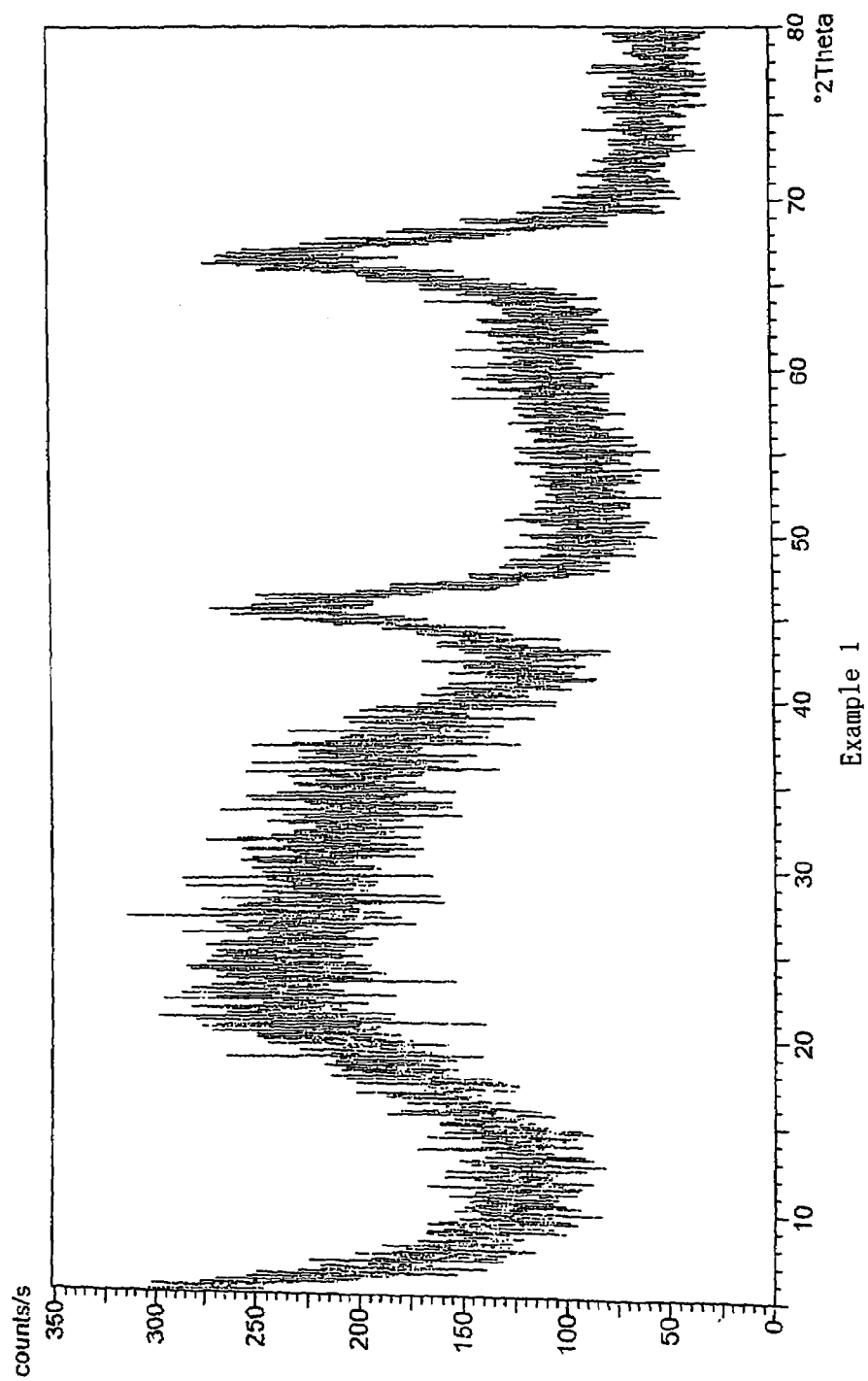
FIG. 1 is a chart showing the results of X-ray diffraction performed on the layered porous titanium oxide prepared in Example 1.
Figure 2:
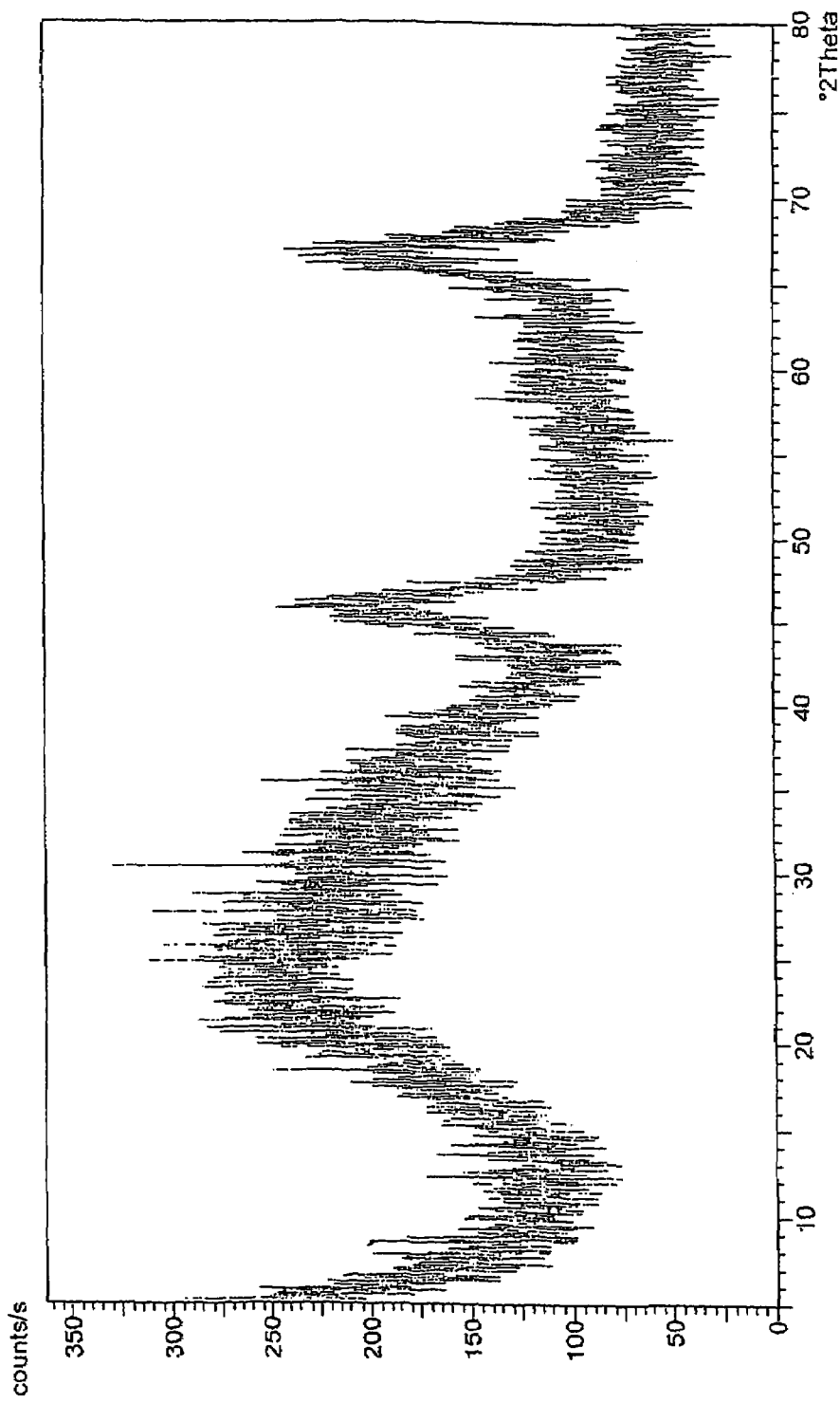
FIG. 2 is a chart showing the results of X-ray diffraction performed on the layered porous titanium oxide prepared in Example 2.
Figure 3:
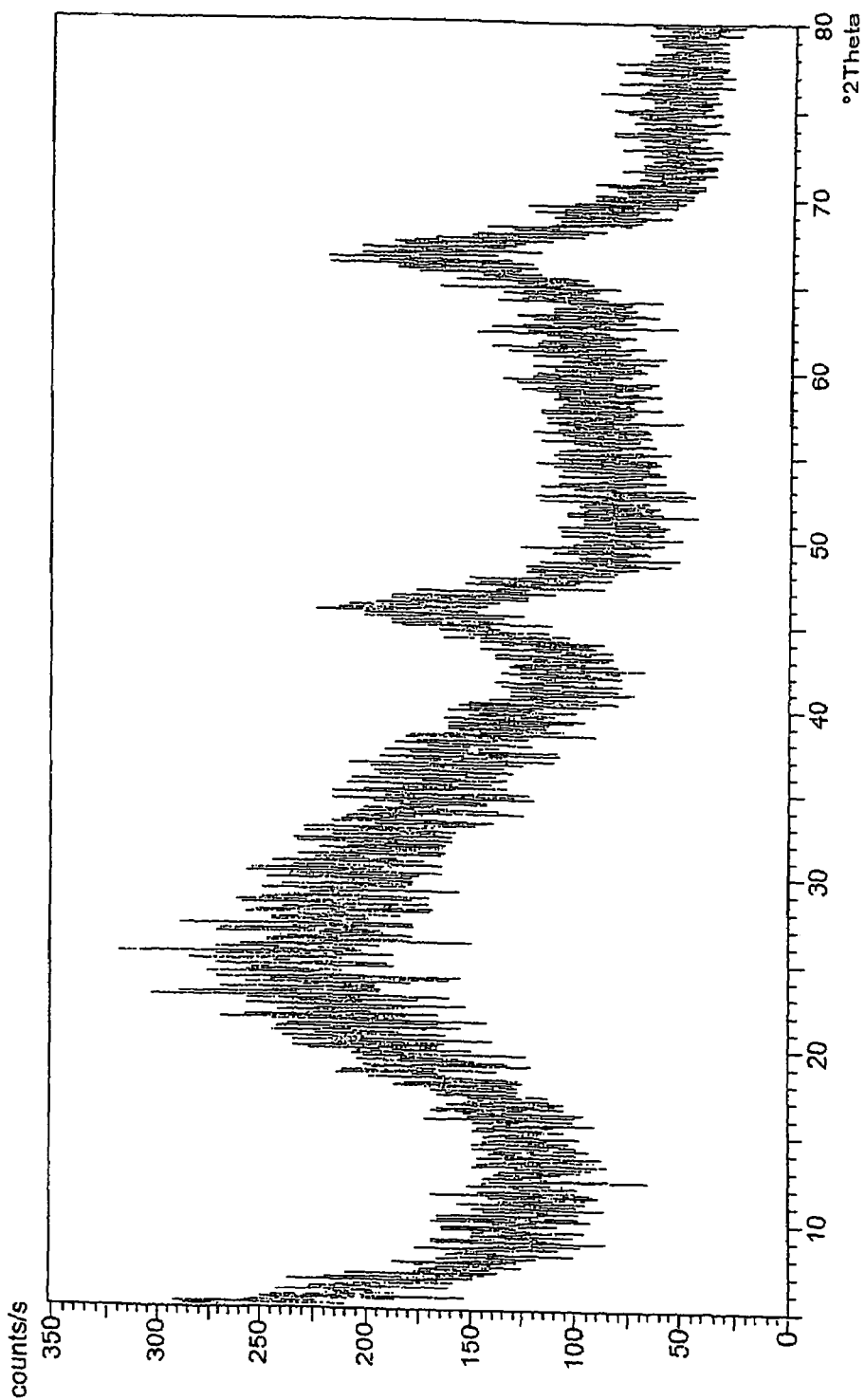
FIG. 3 is a chart showing the results of X-ray diffraction performed on the layered porous titanium oxide prepared in Example 3.
Figure 4:
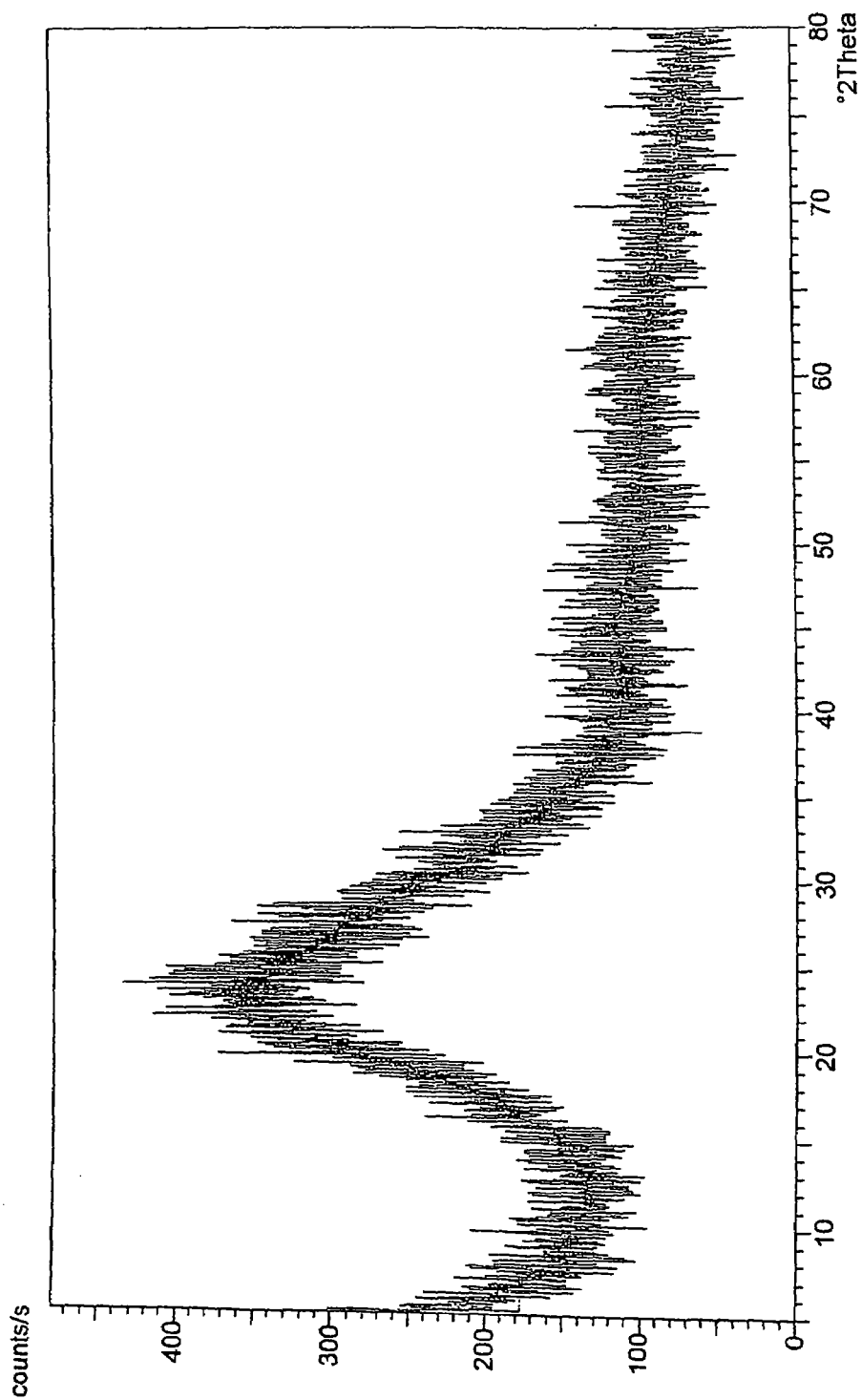
FIG. 4 is a chart showing the results of X-ray diffraction performed on the layered porous titanium oxide prepared in Example 4.
Figure 5:
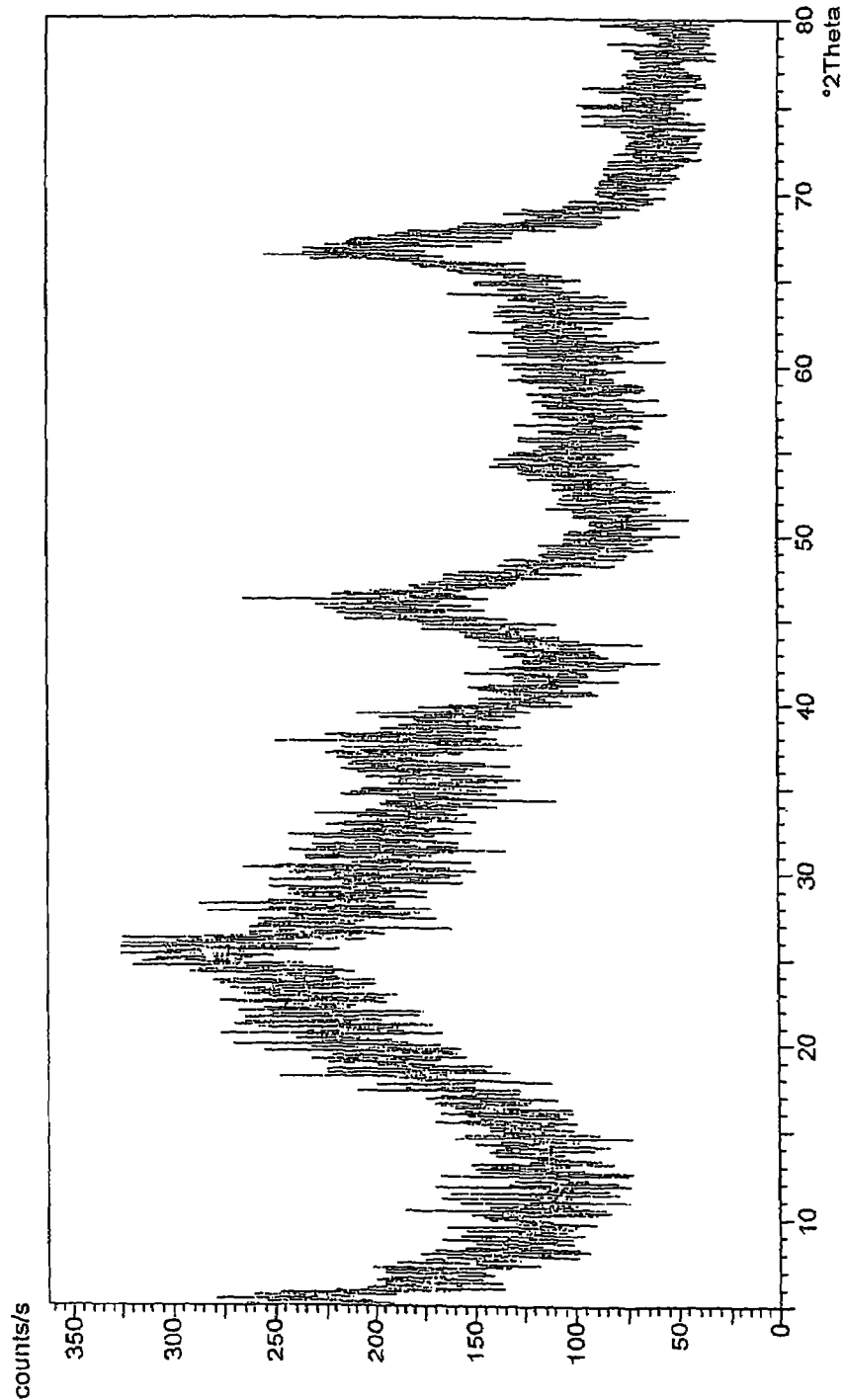
FIG. 5 is a chart showing the results of X-ray diffraction performed on the molded article of alumina/titanium oxide prepared in Comparative Example 1.
Figure 6:
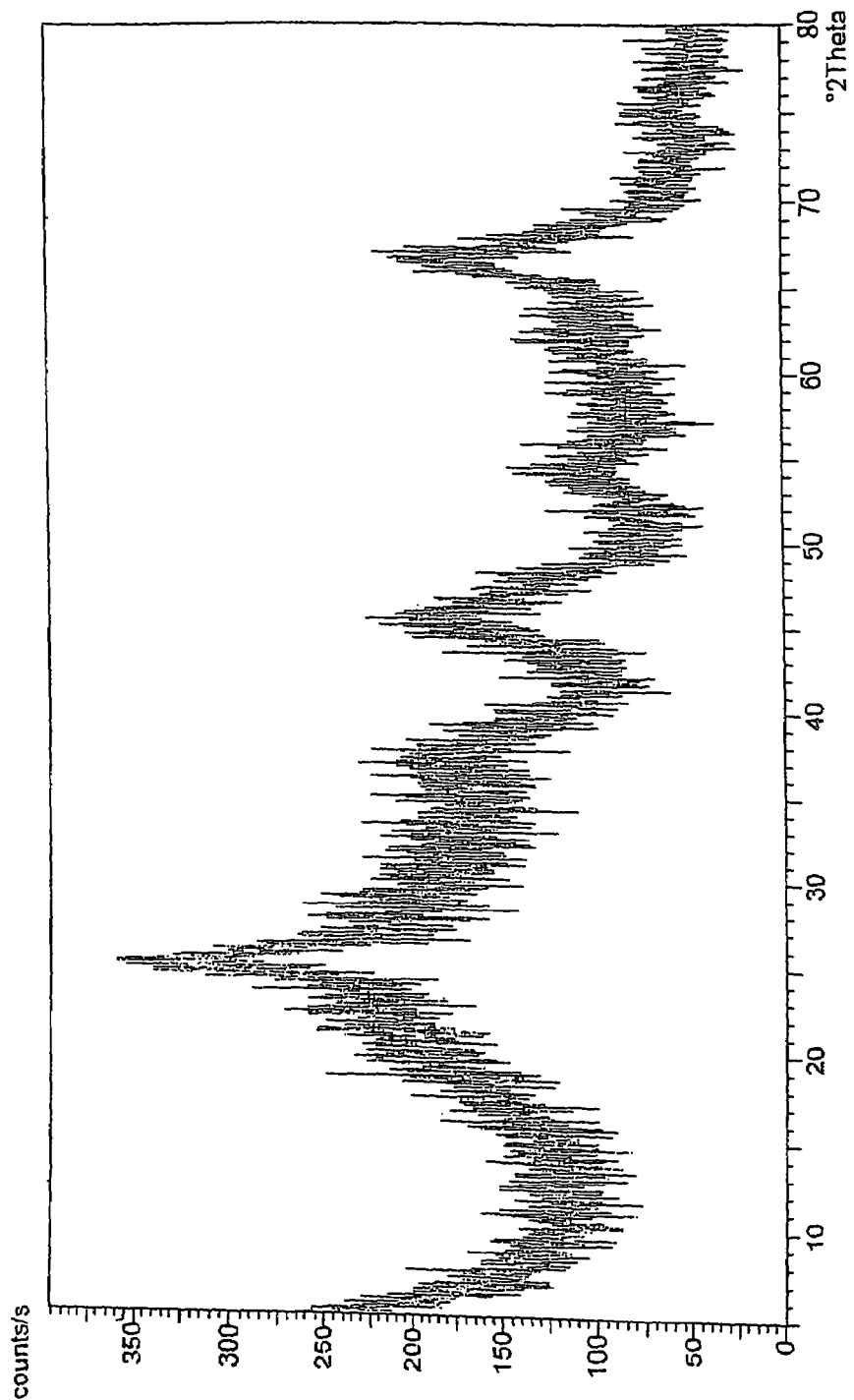
FIG. 6 is a chart showing the results of X-ray diffraction performed on the molded article of alumina/titanium oxide prepared in Comparative Example 2.
Figure 7:
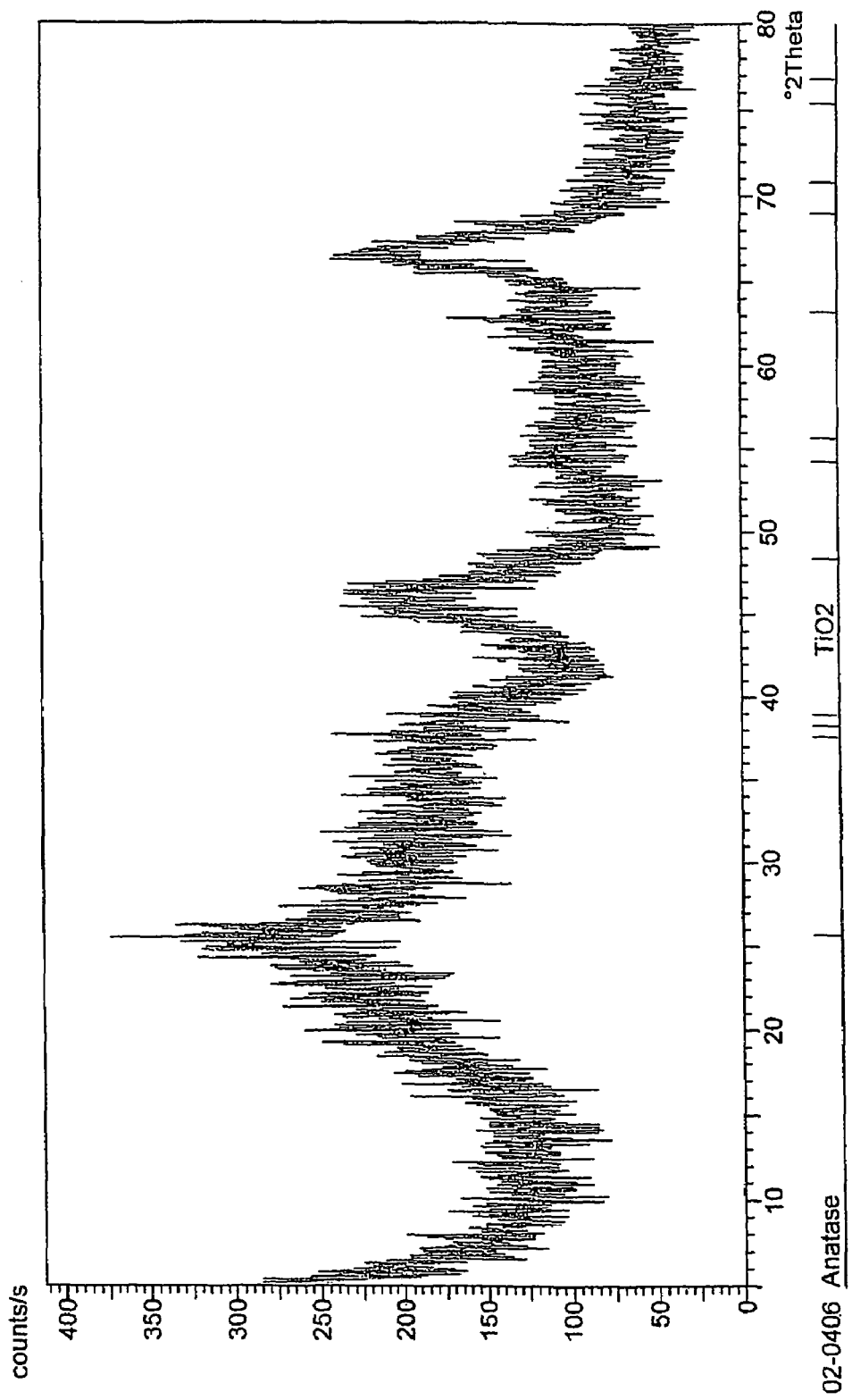
FIG. 7 is a chart showing the results of X-ray diffraction performed on the molded article of alumina/titanium oxide prepared in Comparative Example 3.
Figure 8:
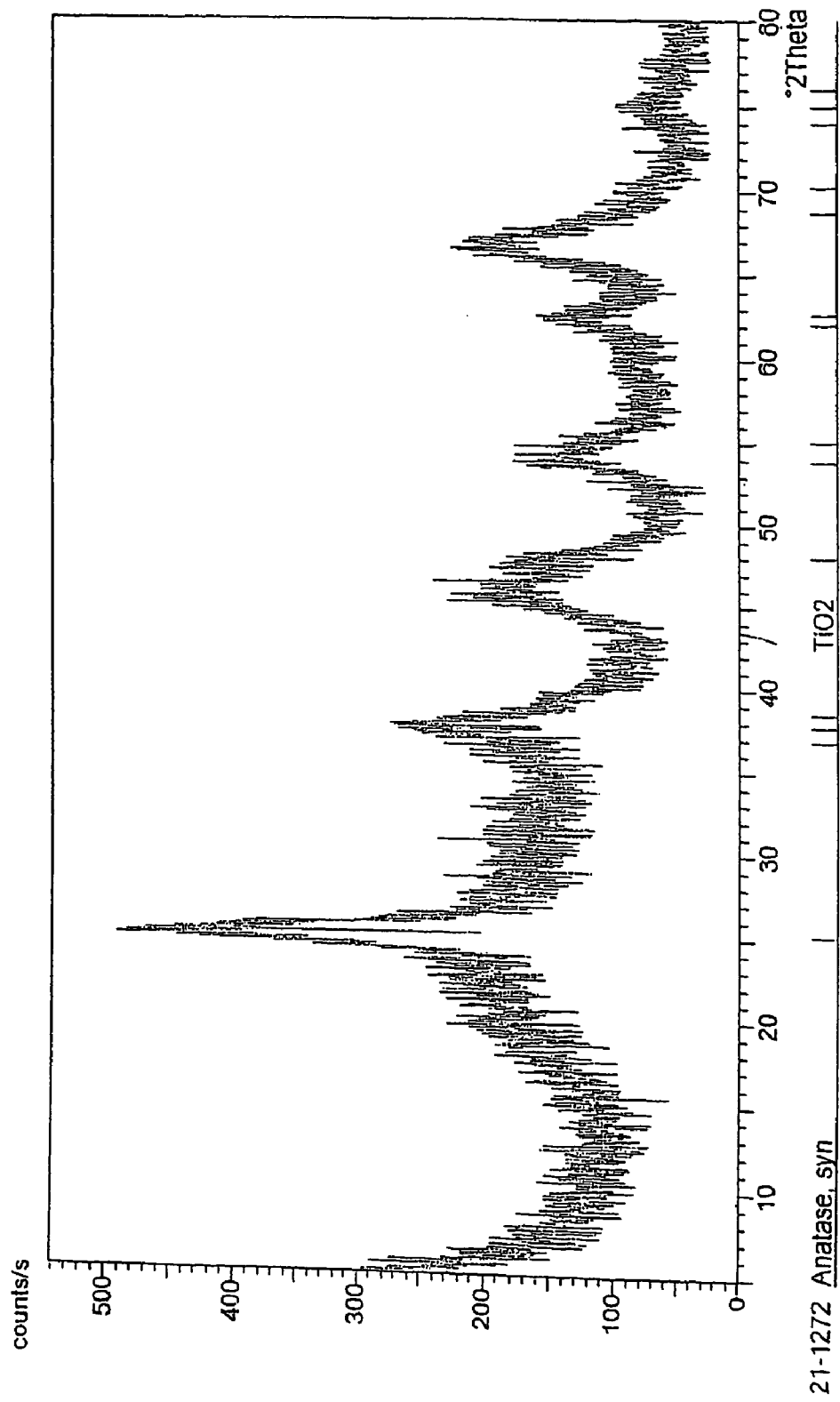
FIG. 8 is a chart showing the results of X-ray diffraction performed on the titanium oxide/alumina mixture prepared in Comparative Example 4.
Figure 9:
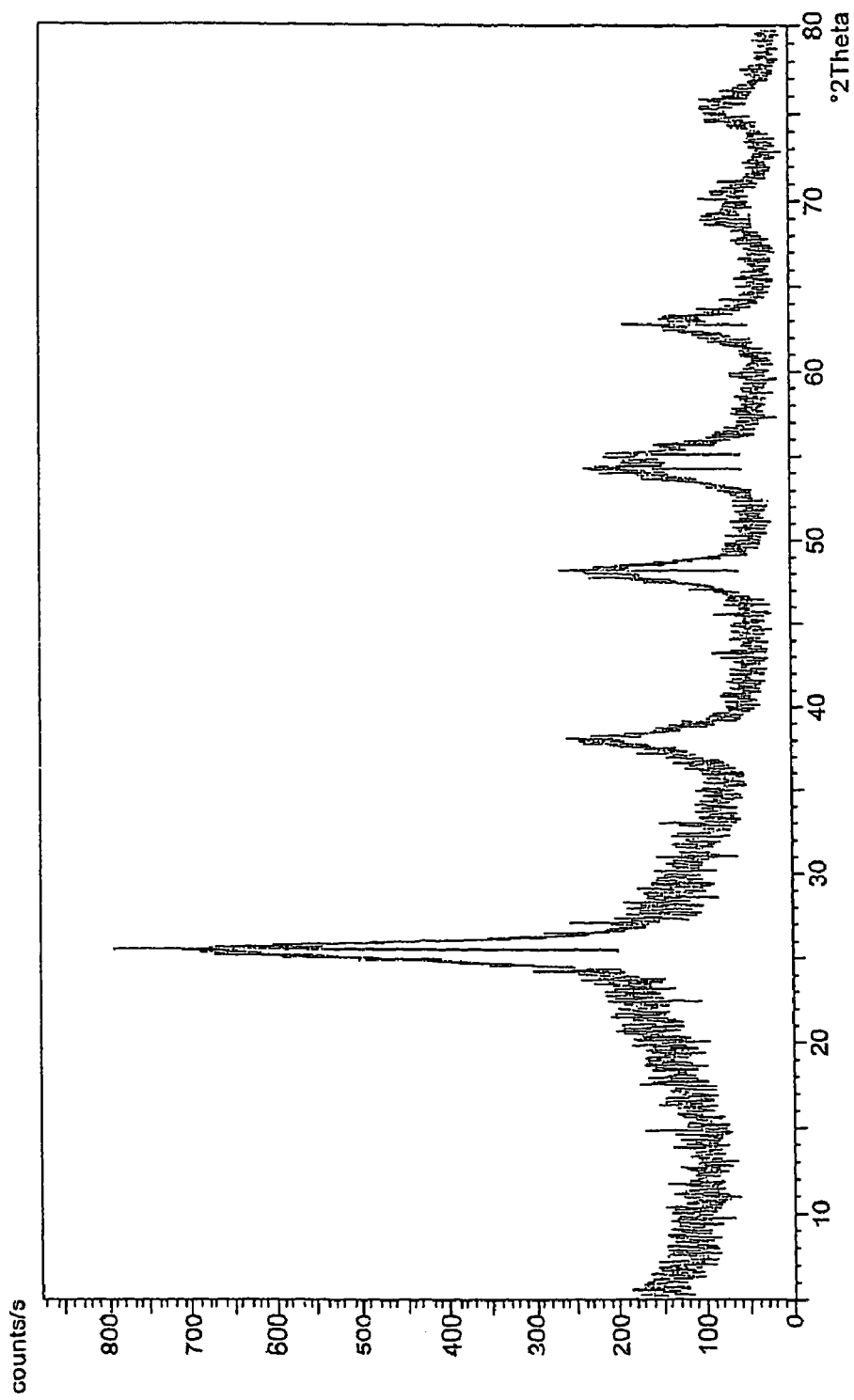
FIG. 9 is a chart showing the results of X-ray diffraction performed on the molded article of titanium oxide prepared in Comparative Example 5.
Figure 10:
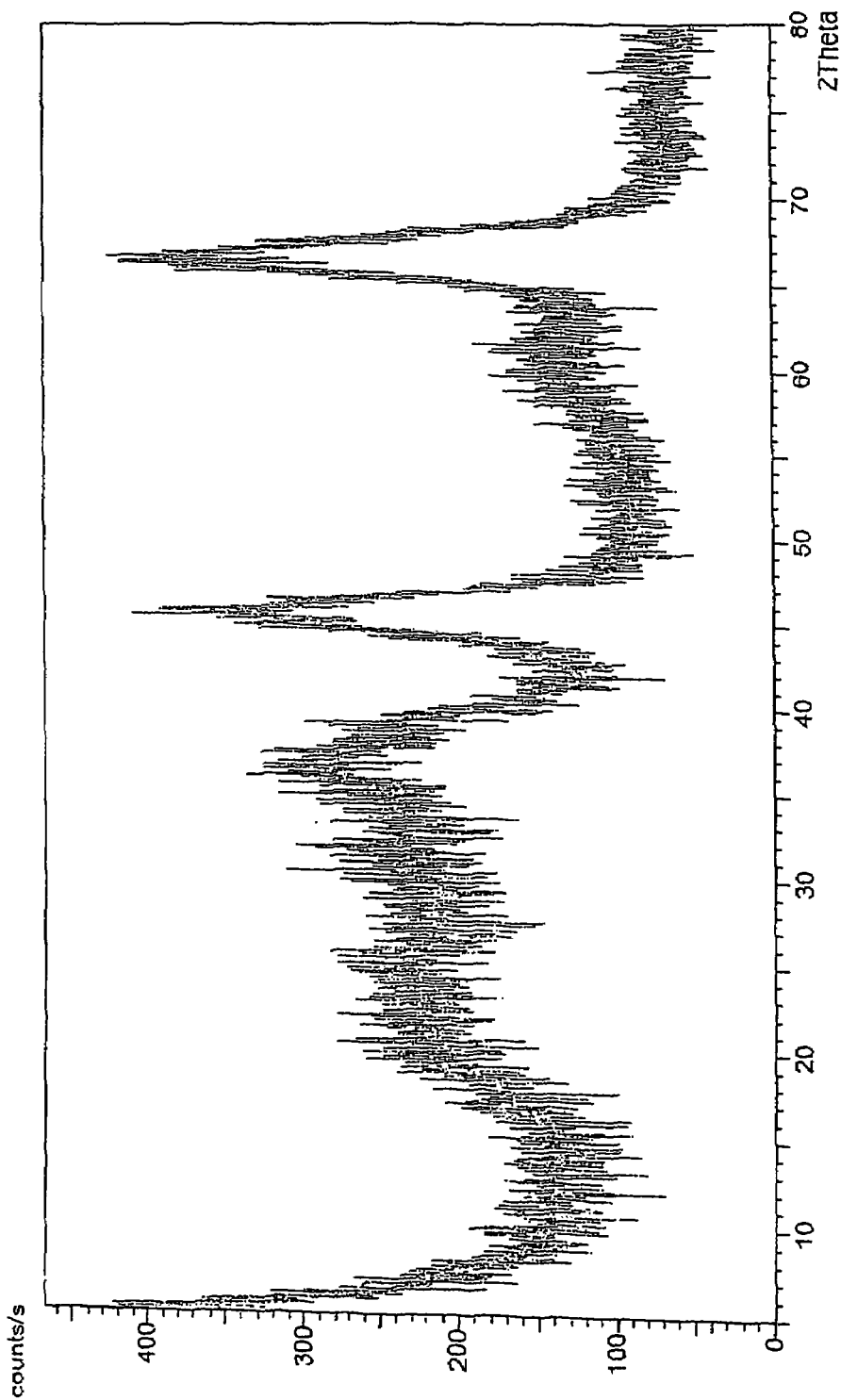
FIG. 10 is a chart showing the results of X-ray diffraction performed on molded article of alumina prepared in Comparative Example 6.

This invention will be described concretely below with reference to the accompanying examples, comparative examples, and test examples. In the following description, "part" or "%" is on the mass basis unless otherwise noted and "L" stands for liter.

Examples 1-4 and Comparative Examples 1-6

Example 1 pH Swing Step 1

An alumina hydrogel (inorganic oxide) to be used as a core was prepared as follows.

The solution A was prepared by adding 2075 g of water to 925 g of aluminum nitrate and the solution B was prepared by adding 2440 g of water to 560 g of sodium aluminate.

To a 15-L enamel container was added 2.5 L of water and the water was heated at 60° C. with stirring. To this enamel container was added 180 g of the solution A and maintained for 5 minutes. The pH of the synthetic solution at this time was 2.5.

Next, 200 g of the solution B was added to the aforementioned enamel container to change the pH of the synthetic solution to pH 9.0 and maintained for 5 minutes.

Thereafter, the operation consisting of adding 180 g of the solution A to change the pH to 2.5, maintaining the mixture for 5 minutes, again adding 180 g of the solution B to change the pH to 9, and maintaining the mixture for 5 minutes was repeated three times.

A dispersion of alumina hydrogel containing 37 g/L of $Al_2O_3$ was prepared in this manner. The alumina in this alumina hydrogel was needle-shaped in its TEM image and showed an aspect ratio (length/width) of approximately 10 and a length of 40 nm.

[Depositing Step]

The dispersion of alumina hydrogel in an amount of 2000 parts was kept at 60° C., 1.8 parts of colloidal silica containing 8% of $SiO_2$ as a particle growth inhibitor was added and then hydrochloric acid as a pH adjusting agent was added to bring the pH to a point between the isoelectric point of titanium oxide and that of alumina, or to 7.5 in this case, in order to unite titanium oxide chemically and/or microscopically to alumina which constitutes the composing element of this invention. Following this, 97.7 parts of a 37.9% titanium tetrachloride solution and 14% ammonia water as a pH adjusting agent were added simultaneously and the reaction was allowed to proceed for 5 minutes while maintaining the pH at 7.5 and the temperature at 60° C. to give a hydrogel of layered porous titanium oxide.

The hydrogel of layered porous titanium oxide thus obtained was washed with water, filtered, molded, and dried at 120° C. for 3 hours.

[Calcining Step]

The layered porous titanium oxide obtained in the depositing step was placed in an oven and calcined at 500° C. for 3 hours to give layered porous titanium oxide of Example 1. The properties of this layered porous titanium oxide are shown in Table 2 below.

Example 2

Layered porous titanium oxide of Example 2 was prepared as in Example 1 with the exception of adding 3.6 parts of the colloidal silica and 146.6 parts of the 37.9% titanium tetrachloride solution. The properties of this layered porous titanium oxide are shown in Table 2 below.

Example 3

Layered porous titanium oxide of Example 3 was prepared as in Example 1 with the exception of adding 5.4 parts of the colloidal silica and 195.4 parts of the 37.9% titanium tetrachloride solution. The properties of this layered porous titanium oxide are shown in Table 2 below.

Example 4

Layered porous titanium oxide of Example 4 was prepared as in Example 1 with the following change in the procedure: the silica hydrogel obtained in the "pH swing step 2" described below was used in place of the alumina hydrogel as an inorganic oxide, 2500 parts of the silica hydrogel dispersion was added, the particle growth inhibitor and the pH adjusting agent were not added, and 146.6 parts of the 37.9% titanium tetrachloride solution and ammonia water were added at pH 4 between the isoelectric point of silica and that of titanium oxide. The properties of this layered porous titanium oxide are shown in Table 2 below.

[pH Swing Step 2]

To a 20-L enamel container was added 5 L of a solution of sodium silicate (JIS No. 3) with a concentration of 100 g/L, the solution was heated at 50° C. with stirring, a 20% sulfuric acid solution was added to bring the pH to 4, and the mixture was maintained for 5 minutes to give a slurry of silica hydrogel. Next, the operation consisting of adding 400 mL of a sodium silicate solution with a concentration of 250 g/L to change the pH to 11, maintaining the mixture for 10 minutes, then adding a 20% sulfuric acid solution to change the pH to 4, and maintaining the mixture for 10 minutes was repeated 7 times.

A dispersion of silica hydrogel containing 28.9 g/L of silica was prepared in this manner. The silica in this hydrogel was spherical and showed a particle diameter of approximately 10 nm.

Comparative Example 1

A dispersion of alumina hydrogel was prepared by following the procedure of the "pH swing step" as in Example 1. This dispersion of alumina hydrogel in an amount of 2000 parts was maintained at 60° C. and 3.6 parts of the same colloidal silica (particle growth inhibitor) as in Example 1 was added and the pH was adjusted to 7.5 by hydrochloric acid.

Using the dispersion of alumina hydrogel thus prepared, titanium oxide was deposited on alumina at a pH which is off the range specified by this invention, that is, outside the range between the isoelectric point of alumina and that of titanium oxide as follows; 48.9 parts of a 37.9% titanium tetrachloride solution was added to bring the pH to 1.0, then 14% ammonia water (pH adjusting agent) was added to change the pH to 7.5 (one pH swing) and this pH swing operation was repeated for a total of three times (three pH swings) to give a precipitate while keeping the temperature at 60° C. and matching the pH to the prescribed level by finely controlling the amount of the pH adjusting agent added.

The precipitate was washed with water, filtered, molded, and dried at 120° C. for 3 hours. The molded article was further calcined as in Example 1 to give a molded article of alumina/titanium oxide of Comparative Example 1. The properties of this molded article are shown in Table 2 below.

Comparative Example 2

The same dispersion of alumina hydrogel containing colloidal silica (particle growth inhibitor) and hydrochloric acid as used in Comparative Example 1 showed a pH of 0.5 upon addition of 195.3 parts of a 37.9% titanium tetrachloride solution and the pH changed to 7.5 upon addition of 14% ammonia water (pH adjusting agent). This pH swing operation was performed at 60° C. to give a precipitate.

The precipitate was washed with water, filtered, molded, and dried at 120° C. for 3 hours. The molded article was further calcined as in Example 1 to give a molded article of alumina/titanium oxide of Comparative Example 2. The properties of this molded alumina/titanium oxide article are shown in Table 2 below.

Comparative Example 3

The same dispersion of alumina hydrogel containing colloidal silica (particle growth inhibitor) and hydrochloric acid as used in Comparative Example 1 showed a pH of 9.5 upon addition of 14% ammonia water and the pH changed to 7.5 upon addition of 65.1 parts of a 37.9% titanium tetrachloride solution (one pH swing). This pH swing operation was repeated for a total of three times (three pH swings) at 60° C. to give a precipitate.

The precipitate was washed with water, filtered, molded, and dried at 120° C. for 3 hours. The molded article was further calcined as in Example 1 to give a molded article of alumina/titanium oxide of Comparative Example 3. The properties of this molded article are shown in Table 2 below.

Comparative Example 4

The alumina hydrogel of Example 1 was washed with water, filtered, molded, dried at 120° C. for 3 hours, and then calcined at 500° C. to give an agglomerate of alumina. An agglomerate of titanium oxide was also prepared as in Comparative Example 5 to be described later.

Using an agate mortar, 71.5 parts of the agglomerate of alumina and 28.5 parts of the agglomerate of titanium oxide were ground together to give a titanium oxide/alumina mixture of Comparative Example 4 containing 28.5% of titanium oxide and 71.5% of alumina. The properties of this mixture are shown in Table 2 below. The alumina in this mixture is needle-shaped in its TEM image and shows an aspect ratio (length/width) of approximately 10 and a length of 40 nm while the titanium oxide is spherical and shows a particle diameter of approximately 7 nm.

Comparative Example 5

Upon addition of 12.5 parts of the same colloidal silica particle growth inhibitor as used in Example 1 to 1100 parts of water kept at 60° C., the pH was 7.5.

The pH changed to 1.5 upon addition of 330 parts of a 37.9% titanium tetrachloride solution and the pH changed to 7.5 (one pH swing) upon further addition of 14% ammonia water (pH adjusting agent). This pH swing operation was repeated for a total of three times (three pH swings) while matching the pH to the prescribed level by finely controlling the amount of the pH adjusting agent added. In this manner, titanium oxide was obtained in spherical particles with a particle diameter of approximately 7 nm in its TEM image.

The spherical particles of titanium oxide were washed with water, filtered, molded, and dried at 120° C. for 3 hours. Further, the spherical particles of titanium oxide collected by filtration were calcined as in Example 1 to give an agglomerate of titanium oxide of Comparative Example 5. The properties of this agglomerate of titanium oxide are shown in Table 2 below.

Comparative Example 6

The solution A was prepared by adding 2075 g of water to 925 g of aluminum nitrate and then the solution B was prepared by adding 2440 g of water to 560 g of sodium aluminate.

In a 15-L enamel container was placed 2.5 L of water and the water was heated at 60° C. with stirring. To this enamel container was added 180 g of the solution A and maintained for 5 minutes. The pH of the synthetic solution was 2.5 at this point.

Upon addition of 200 g of the solution B to the aforementioned enamel container, the pH of the synthetic solution changed to 9.0 and the mixture was maintained for 5 minutes.

Thereafter, the operation consisting of adding 180 g of the solution A to change the pH to 2.5, maintaining the mixture for 5 minutes, then adding 180 g of the solution B to change the pH to 9, and maintaining the mixture for 5 minutes was repeated three times.

The alumina thus obtained was washed with water, filtered, molded, and dried at 120° C. for 3 hours. The molded article was further calcined as in Example 1 to give a molded article of alumina of Comparative Example 6. The properties of this molded alumina article are shown in Table 2 below.

TABLE 2

| | Amount of deposited titanium oxide (%) | Pore sharpness degree (%) | Pore volume (mL/g) | Specific surface area (m²/g) | Mechanical strength (SCS) kg/mm |
|---|---|---|---|---|---|
| Example 1 | 16.6 | 78 | 0.600 | 335 | 1.1 |
| Example 2 | 23.0 | 75 | 0.562 | 342 | 1.1 |
| Example 3 | 28.5 | 71 | 0.571 | 317 | 1.3 |
| Example 4 | 23.0 | 89 | 0.863 | 412 | 0.8 |
| Comparative example 1 | 23.0 | 79 | 0.546 | 289 | 0.9 |
| Comparative Example 2 | 28.5 | 78 | 0.537 | 263 | 0.8 |
| Comparative Example 3 | 28.2 | 45 | 0.503 | 279 | 0.8 |
| Comparative Example 4 | (28.5) | 39 | 0.490 | 259 | — |
| Comparative Example 5 | (98.5) | 78 | 0.324 | 140 | 0.6 |
| Comparative Example 6 | (98.5) | 78 | 0.576 | 314 | 1.0 |

(Note: The amount of deposited titanium oxide in Comparative Example 4 or 5 is actually the existing amount of titanium oxide and that in Comparative Example 6 is actually the existing amount of alumina.)

[Evaluation Tests]

The specimens obtained in the aforementioned Examples 1-4 and Comparative Examples 1-6 were evaluated by the following test methods.

(X-ray Diffraction)

The Specimen was Mounted in a Powder X-Ray Diffractometer (XPERT SYSTEM/APD-1700, available from Philips) and its diffraction pattern was obtained. The results are shown in FIGS. 1-10. The powder X-ray diffractometer was operated under the following conditions.

1. Setting
   Mode of sample stage: rotary
   Number of rotation: 1
2. Parameters measured
   Start angle: 50
   End angle: 80°
   Step size: 0.02°
   Step time: 0.4 second
   Scan speed: 0.05°/sec
   Number of steps: 3750
   Total time: 25 minutes The main peak $2\theta=26.5°$ of titanium oxide (anatase) is detected not only in FIG. 9 which shows the results of Comparative Example 5 relating to titanium oxide alone but also in FIGS. 5-8 relating to comparative examples. However, this peak is detected not clearly in FIGS. 1-4 relating to Examples 1-4. This indicates that titanium oxide is chemically and/or microscopically united to the aforementioned inorganic oxide in Examples 1-4.

[Observation by TEM]

With the aid of a transmission electron microscope (TEM; EM-002B, VOYAGER M3055, available from Topcon/Norlan Instrument Co., Ltd.), an image at 2,000,000-fold magnification was confirmed for each specimen.

In each of comparative examples, spherical primary particles presumably of titanium oxide crystals with a lattice spacing of 0.38 nm were confirmed. Particularly in Comparative Example 4, a condition indicating mixed existence of distinctly spherical primary particles of titanium oxide and needle-shaped objects, presumably crystals of alumina, was confirmed. However, spherical primary particles of titanium oxide were scarcely confirmed in Examples 1 and 2 and they were not confirmed at all in Example 3. This indicates that titanium oxide is chemically and/or microscopically united to the aforementioned inorganic oxide in these examples.

[Mechanical Strength]

The specimen was tested for the mechanical strength according to the following method.

The mechanical strength was measured in conformity to the test method for the side crushing strength (SCS) relating to cylindrical desulfurization catalysts by the use of a Kiya type strength tester. One hundred samples, roughly equal in diameter and 3.5 to 4.5 mm in length, were dried in advance and tested one by one; a load was applied to the sample at constant velocity and the load at the time of breakage was divided by the length of the sample to calculate SCS. The test results are shown in Table 2 below.

[Characteristics of Catalysts]

Hydrodesulfurization catalysts for petroleum fractions were prepared by depositing Mo, Co, and P (catalyst metals) on each of the specimens obtained in Example 3 and Comparative Examples 2, 5, and 6 as follows. The hydrogel prepared in Example 3 was washed with water, filtered, and dehydrated until the solid content became 20-30%. The hydrogel was then thrown in an aqueous solution containing ammonium paramolybdate, cobalt nitrate, and phosphoric acid (that is, an aqueous solution containing Mo, Co, and P), the mixture was stirred for 1 hour, filtered, and the hydrogel impregnated with the catalyst metals was molded, dried at 120° C. for 3 hours, and calcined at 500° C. for 3 hours to give a MoCoP catalyst comprising Mo, Co, and P deposited on layered porous titanium oxide (catalyst A).

Likewise, the calcined layered porous titanium oxide prepared in Example 3 was impregnated with the aforementioned aqueous solution containing Mo, Co, and P to give a MoCoP catalyst comprising Mo, Co, and P deposited on layered porous titanium oxide (catalyst B).

Furthermore, the hydrogels prepared in Comparative Examples 2, 5, and 6 were processed as in the case of the aforementioned MoCoP catalyst A to give MoCoP catalysts of these Comparative Examples comprising Mo, Co, and P deposited on carriers derived from respective hydrogels. The catalysts comprising the specimens of Example 3 and Comparative Examples 2, 5, and 6 as catalyst carriers were tested for their catalytic activity as follows.

[Hydrodesulfurization Tests of Gas Oil]

Figure 11:
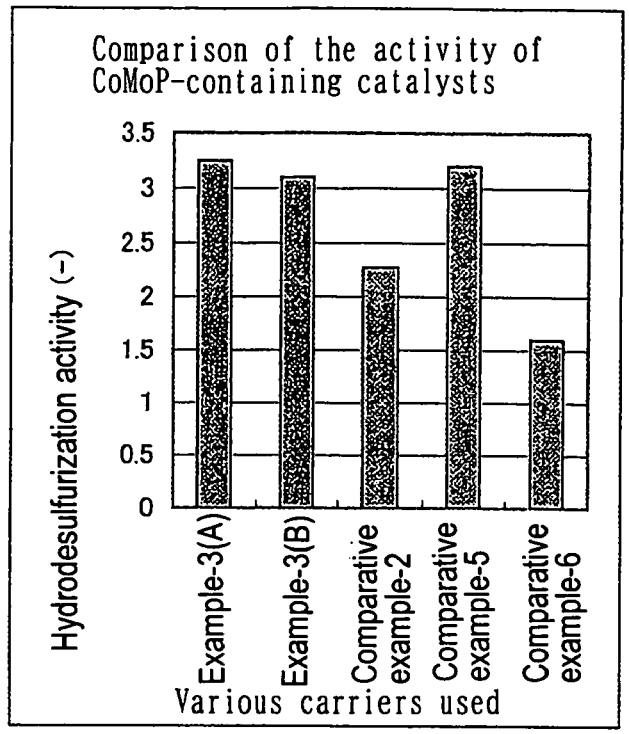
FIG. 11 is a graph showing the catalytic activity in the hydrodesulfurization test of gas oil.

The hydrodesulfurization of gas oil was carried out in a high-pressure flow type reactor under the following conditions: reaction pressure, 5 MPa; reaction temperature, 350° C.; liquid hourly space velocity, 2.0 $h^{-1}$; and ratio of hydrogen to feedstock, 250 Nl/l. The catalysts used in the test were all subjected to a sulfidation treatment in advance with gas oil whose sulfur content had been adjusted to 2.5% by addition of dimethyl disulfide. The results are shown graphically in FIG. 11.

It is apparent from these results that the desulfurization activity of the catalysts prepared in this invention is comparable to that of titanium oxide alone prepared in Comparative Example 5 and the properties inherent in titanium oxide are fully manifested.

Examples 5-11 and Comparative Examples 7-16 pH Swing Step 1

An alumina hydrogel (inorganic oxide) to be used as a core was prepared as follows.

The solution A was prepared by adding 1660 g of water to 740 g of aluminum nitrate and the solution B was prepared by adding 1952 g of water to 448 g of sodium aluminate.

In a 12-L enamel container was placed 2.0 L of water and the water was heated at 60° C. with stirring. To this container was added 144 g of the solution A and maintained for 5 minutes. The pH of the synthetic solution at this time was 2.5.

Following this, 160 g of the solution B was added to the enamel container to change the pH of the synthetic solution to 9.0 and maintained for 5 minutes.

Thereafter, the operation consisting of adding 144 g of the solution A to change the pH to 2.5, maintaining the mixture for 5 minutes, again adding 144 g of the solution B to change the pH to 9, and maintaining the mixture for 5 minutes was repeated three times.

A dispersion of alumina hydrogel containing 37 g/L of $Al_2O_3$ was prepared in this manner. The alumina in this hydrogel was needle-shaped in its TEM image and showed an aspect ratio (length/width) of approximately 10 and a length of 40 nm.

Comparative Example 7

Depositing Step

To 1000 parts of the dispersion of alumina hydrogel thus obtained and kept at 60° C. was added 0.9 part of colloidal silica containing 8% of $SiO_2$ as a particle growth inhibitor, the pH was adjusted to a point between the isoelectric point of titanium oxide and that of alumina, or to 7.5 in this case, by addition of hydrochloric acid as a pH adjusting agent, then 52.0 parts of a 37.9% titanium tetrachloride solution and 14% ammonia water as a pH adjusting agent were added simultaneously, and the reaction was allowed to proceed for 5 minutes while maintaining the pH at 7.5 and the temperature at 60° C.

The layered porous titanium oxide thus obtained was washed with water, filtered, molded, and dried at 120° C. for 3 hours.

[Calcining Step]

The layered porous titanium oxide obtained in the depositing step was calcined in an oven at 500° C. for 3 hours to give layered porous titanium oxide of Comparative Example 7 and its properties are shown in Table 3.

Example 5

Layered porous titanium oxide of Example 5 was prepared as in Comparative Example 7 with the exception of adding 1.8 parts of the colloidal silica and 65.0 parts of the 37.9% titanium tetrachloride solution and its properties are shown in Table 3.

Examples 6-10

The specimens of layered porous titanium oxide of Examples 6-10 were prepared as in Example 5 with the exception of adding 2.7 parts of the colloidal silica and changing the added amount of the 37.9% titanium tetrachloride solution from example to example, that is, 77.0 parts in Example 6, 101.0 parts in Example 7, 126.0 parts in Example 8, 155.0 parts in Example 9, and 189.0 parts in Example 10. Their properties are shown in Table 3.

Comparative Examples 8-10

The specimens of layered porous titanium oxides of Comparative Examples 8-10 were prepared as in Example 5 with the exception of adding 2.7 parts of the colloidal silica and changing the added amount of the 37.9% titanium tetrachloride solution from example to example, that is, 235.0 parts in Comparative Example 8, 310.0 parts in Comparative Example 9, and 465.0 parts in Comparative Example 10. Their properties are shown in Table 3.

Figure 14:
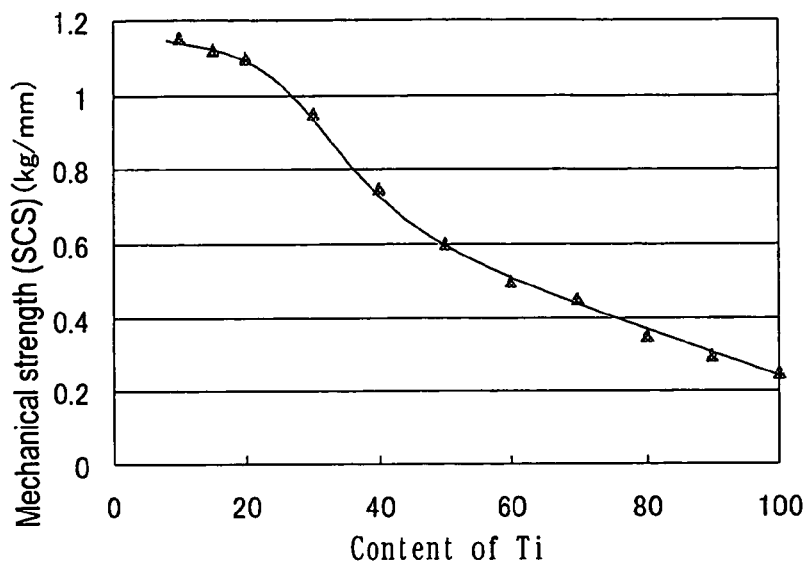
FIG. 14 is a graph showing the relationship between the content of titania and the mechanical strength (SCS) for the molded articles of alumina/titanium oxide prepared respectively in Examples 5-10 and Comparative Examples 7-11.

As is shown in FIG. 14, the side crushing strength (SCS) is 0.5 kg/mm or more for the specimens of Comparative Example 7 and Examples 5-10, but it is 0.5 kg/mm or less for the specimens of Comparative Examples 8-10 or a strength not strong enough for use in commercial catalysts.

Example 11

Layered porous titanium oxide of Example 11 was prepared as in Example 5 with the exception of using the silica hydrogel obtained in the pH swing step 2 to be described below in place of the alumina hydrogel as an inorganic oxide, using 1250 parts of the dispersion of silica hydrogel, omitting the addition of the particle growth inhibitor and the pH adjusting agent, and adding 73.3 parts of the 37.9% titanium tetrachloride solution and ammonia water at pH 4 between the isoelectric point of silica and that of titanium oxide. The properties of this layered porous titanium oxide are shown in Table 3.

[pH Swing Step 2]

In a 16-L enamel container was placed 4 L of a solution of sodium silicate (JIS No. 3) with a concentration of 100 g/L, the solution was heated at 50° C. with stirring, a 20% sulfuric acid solution was added to bring the pH to 4, and the mixture was maintained for 5 minutes to give a slurry of silica hydrogel. Following this, the operation consisting of adding 320 ml of a sodium silicate solution with a concentration of 250 g/L to the slurry to change the pH to 11, maintaining the mixture for 10 minutes, then adding a 20% sulfuric acid solution to change the pH to 4, and maintaining the mixture for 10 minutes was repeated 7 times.

A dispersion containing 28.9 g/L of the silica hydrogel was prepared in this manner. The silica in the silica hydrogel thus obtained was spherical and showed a particle diameter of approximately 10 nm.

Comparative Example 11

Upon addition of 11.0 parts of the same colloidal silica (particle growth inhibitor) as used in Comparative Example 7 to 1000 parts of water which was kept at 60° C., the pH became 7.5.

The pH changed to 1.5 upon addition of 300 parts of a 37.9% titanium tetrachloride solution and the pH changed to 7.5 upon further addition of 14% ammonia water as a pH adjusting agent (one pH swing). This pH swing operation was repeated for a total of three times (three pH swings) while matching the pH to the prescribed level by finely controlling the amount of the pH adjusting agent added. In this manner, titanium oxide was obtained in spherical particles showing a particle diameter of approximately 7 nm in their TEM image.

The spherical particles of titanium oxide were washed with water, filtered, molded, and dried at 120° C. for 3 hours. Furthermore, the spherical particles of titanium oxide after filtration were calcined as in Comparative Example 7 to give an agglomerate of titanium oxide of Comparative Example 11. The properties of this agglomerate of titanium oxide are shown in Table 3.

Comparative Example 12

A dispersion of alumina hydrogel was obtained by the pH swing operation as in Comparative Example 7. This dispersion in an amount of 1000 parts was kept at 60° C., 1.8 parts of the same colloidal silica (particle growth inhibitor) as used in Example 5 was added, and the pH was adjusted to 7.5 by hydrochloric acid.

Using the resulting dispersion, titanium oxide was deposited on alumina at a pH outside the range specified by this invention, that is, outside the range between the isoelectric point of alumina and that of titanium oxide as follows. The pH changed to 1.0 upon addition of 26.0 parts of a 37.9% titanium tetrachloride solution and the pH changed to 7.5 upon further addition of 14% ammonia water as a pH adjusting agent (one pH swing). This pH swing operation was repeated for a total of three times (three pH swings) to give a precipitate while keeping the temperature at 60° C. and matching the pH to the prescribed level by finely controlling the amount of the pH adjusting agent added.

The precipitate was washed with water, filtered, molded, and dried at 120° C. for 3 hours. The molded article was further calcined as in Comparative Example 7 to give a molded article of alumina/titanium oxide of Comparative Example 12. The properties of this molded article are shown in Table 3.

Comparative Example 13

Upon addition of 77.0 parts of a 37.9% titanium tetrachloride solution to the same dispersion of alumina hydrogel containing the colloidal silica (particle growth inhibitor) and hydrochloric acid as used in Comparative Example 7, the pH became 0.5. Upon further addition of 14% ammonia water as a pH adjusting agent, the pH changed to 7.5. This operation was performed at 60° C. to give a precipitate.

The precipitate was washed with water, filtered, molded, and dried at 120° C. for 3 hours. The molded article was further calcined as in Comparative Example 7 to give a molded article of alumina/titanium oxide of Comparative Example 13. The properties of this molded article are shown in Table 3.

Figure 12:
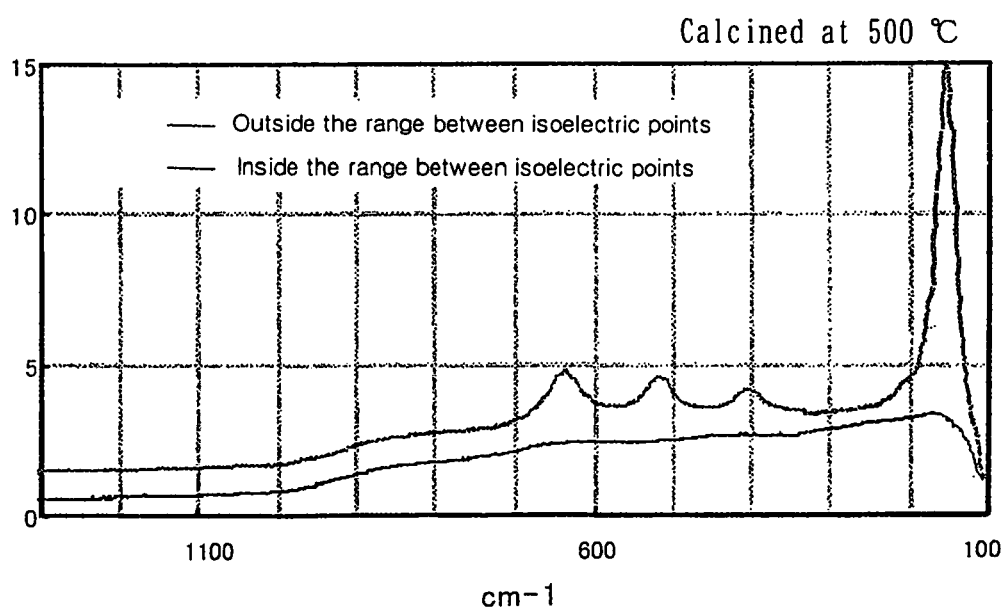
FIG. 12 is a chart showing a comparison of the results of Raman spectroscopic analysis performed on the specimens of layered porous titanium oxide respectively prepared in Comparative Example 13 and Example 5.

The results of Raman spectroscopic analysis conducted in Comparative Example 13 and Example 5 are shown in FIG. 12 for comparison. The typical crystal peaks of anatase were observed in the case of Comparative Example 13 where titanium oxide was deposited outside the range between the two isoelectric points. However, the crystal peaks of anatase were not observed at all in the case of Example 5 where titanium oxide was deposited at a pH between the two isoelectric points even when the same amount of titanium oxide was used in the two examples. As in Example 5, the crystal peaks of anatase were not observed in Examples 6-11.

Comparative Example 14

The same dispersion of alumina hydrogel containing the colloidal silica (particle growth inhibitor) and hydrochloric acid as used in Comparative Example 7 showed a pH of 9.5 upon addition of 14% ammonia water and the pH changed to 7.5 upon further addition of 26.0 parts of a 37.9% titanium tetrachloride solution (one pH swing). This pH swing operation was performed for a total of three times (three pH swings) at 60° C. to give a precipitate.

The precipitate was washed with water, filtered, molded, and dried at 120° C. for 3 hours. The molded article was further calcined as in Example 5 to give a molded article of alumina/titanium oxide of Comparative Example 14. The properties of this molded article are shown in Table 3.

Comparative Example 15

The alumina hydrogel of Comparative Example 7 was washed with water, filtered, molded, dried at 120° C. for 3 hours, and then calcined at 500° C. to give an agglomerate of alumina.

Then, 80.0 parts of the aforementioned agglomerate of alumina and 20.0 parts of the agglomerate of titanium oxide of Comparative Example 12 were ground and mixed in an agate mortar to give a titanium oxide/alumina mixture of Comparative Example 11 containing 20.0% of titanium oxide and 80.0% of alumina. The properties of this mixture are shown in Table 1. The alumina in this mixture is needle-shaped in its TEM image and showed an aspect ratio (length/width) of approximately 10 and a length of 40 nm. On the other hand, the titanium oxide in the mixture was spherical and showed a particle diameter of approximately 7 nm.

Comparative Example 16

The solution A was prepared by adding 2075 g of water to 925 g of aluminum nitrate and the solution B was prepared by adding 2440 g of water to 560 g of sodium aluminate.

In a 15-L enamel container was placed 2.5 L of water and the water was heated at 60° C. with stirring. To this container was added 180 g of the solution A and maintained for 5 minutes. The pH of the synthetic solution at this moment was 2.5.

Next, 200 g of the solution B was added to the enamel container to change the pH of the synthetic solution to 9.0 and maintained for 5 minutes.

Thereafter, the operation consisting of adding 180 g of the solution A to change the pH to 2.5, maintaining the mixture for 5 minutes, again adding 180 g of the solution B to change the pH to 9, and maintaining the mixture for 5 minutes was repeated 3 times.

The alumina thus obtained was washed with water, filtered, molded, and dried at 120° C. for 3 hours. The molded article was further calcined as in Comparative Example 7 to give a molded article of alumina of Comparative Example 16. The properties of this molded article of alumina are shown in Table 3.

Figure 13:
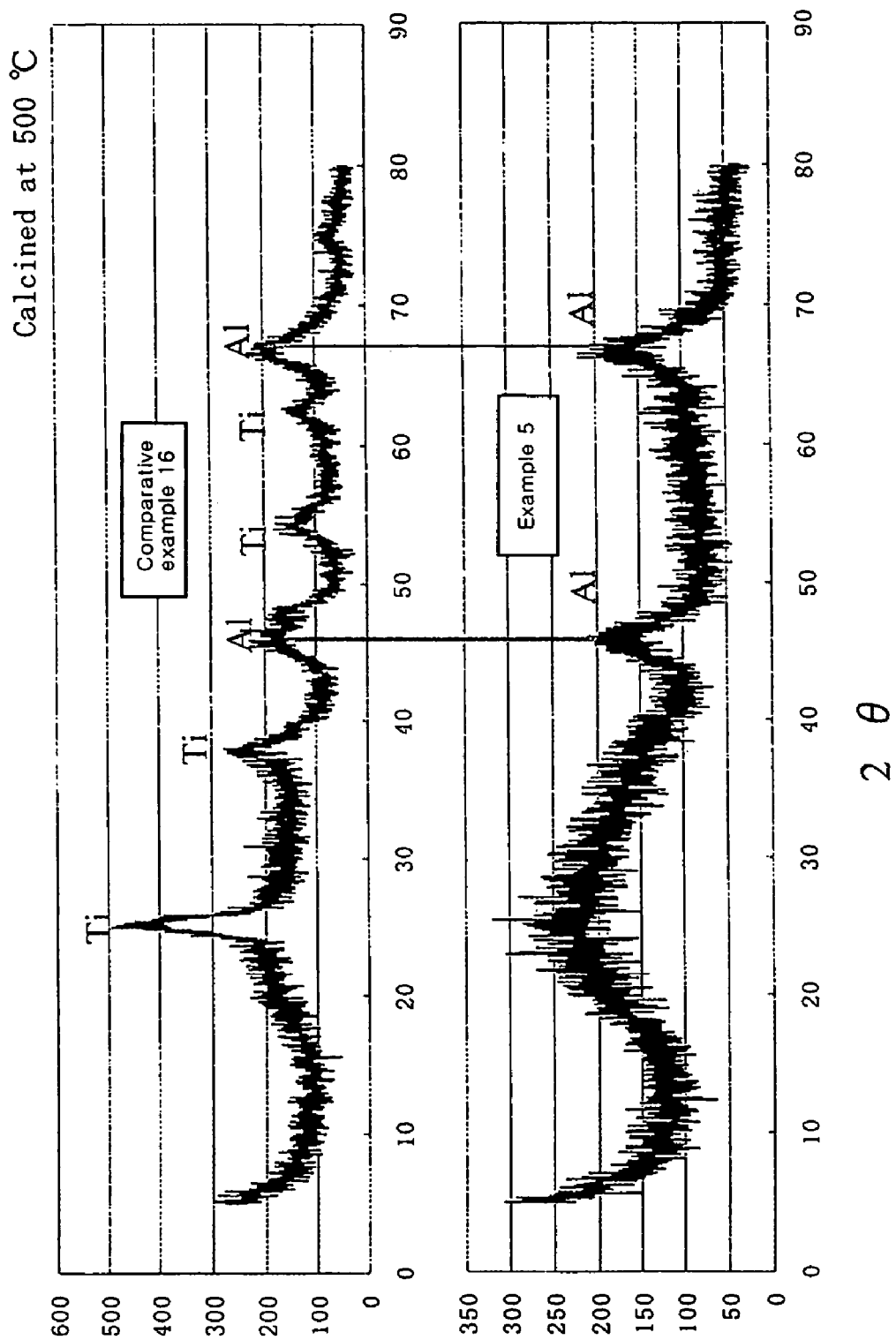
FIG. 13 is a chart showing a comparison of the results of X-ray diffraction performed on the specimens of layered porous titanium oxide respectively prepared in Comparative Example 16 and Example 5.

The main peak of titanium oxide (anatase) was detected at $2\theta=26.5°$ and the peaks of alumina at 46.0° and 67.0° when the specimen of Comparative Example 16 was measured by X-ray diffraction, but these peaks are not detected clearly in Example 5. This indicates that the crystals of titanium oxide on the surface are too small to be detected by X-ray or they are amorphous in Example 5. A comparison of the results of X-ray diffraction conducted in Comparative Example 16 and Example 5 is shown in FIG. 13. As in Example 5, the peaks of titanium oxide were not observed in Comparative Example 7 and Examples 6-11.

[Evaluation Tests]

The specimens obtained in the aforementioned Examples 5-11 and Comparative Examples 7-16 were evaluated according to the test methods to be described below.

(Definition of Titanium Localization Index)

The amounts of aluminum (M) and titanium (Ti) are respectively measured by the use of an X-ray photoelectron spectrometer (XPS: JPS-9010 available from JEOL Ltd.) under the following conditions and the proportion of titanium (Ti) to the sum of aluminum (M) and titanium (Ti) or $B=Ti_{XPS}/(Ti_{XPS}+M_{XPS})$ was calculated.

Measuring Conditions for XPS
X-ray source: MgKα (excitation energy, 1253.6 eV)
Voltage applied: 10 kV
Emission current: 20 mA
Pass energy: 50 eV
Photoelectron takeout angle: 90°
Sputtering: none Then, the bulk mixing molar ratio of titanium (Ti) to the sum of aluminum (M) and titanium (Ti) or $A=Ti/(Ti+M)$ was calculated and the titanium localization index (B/A) was obtained from the bulk mixing molar ratio (A) and the proportion of titanium (B).

The titanium localization index (B/A) thus obtained is shown in Table 3.

(X-ray Diffraction)

The Test for the X-Ray Diffraction was Conducted as in the aforementioned Examples 1-4 and Comparative Examples 1-6 and the results are shown in Table 3.

(Raman Spectroscopy)

The specimens were submitted to measurements by Raman spectroscopy by the use of a laser Raman spectrometer (Model NRS-1000, available from JASCO Corporation) under the following conditions.

Measuring conditions for laser Raman spectroscopy
Excitation wavelength: 532.22 nm green laser (light source, JUNO 100S available from Showa Optonics)
Laser output: 14 mW
Spectroscope: single
Grating: 1800 l/mm
Exposure time: 20.0 seconds
Accumulated number of times: 3
Specimen shape: extrusion-molded cylindrical article The results of Raman spectroscopic measurements are shown in Table 3.

(Mechanical Strength)

The test for the mechanical strength was conducted as in the aforementioned Examples 1-4 and Comparative Examples 1-6 and the results are shown in Table 3.

(Characteristics of Catalysts)

Using the specimens of Examples 5, 6, and 9 and Comparative Examples 7, 11, and 12 as catalyst carriers, Mo, Co, and P (catalyst metals) were deposited on these specimens before calcining as in the aforementioned Example 3 and Comparative Examples 2, 5, and 6 and then calcined to give MoCoP catalysts comprising Mo, Co, and O deposited on titanium oxide (catalyst A).

Moreover, the calcined catalyst carriers of Comparative Examples 15 and 16 were impregnated with the aforementioned aqueous solution of Mo, Co, and P to give catalysts comprising Mo, Co, and P deposited on titanium oxide or alumina (catalyst B).

The catalysts prepared from the specimens of Examples 5, 6, and 9 and Comparative Examples 11 and 12 and those prepared from the specimens of Comparative Examples 15 and 16 were tested for their catalytic activity according to the following test methods.

(Test for Hydrodesulfurization of VGO)

Figure 15:
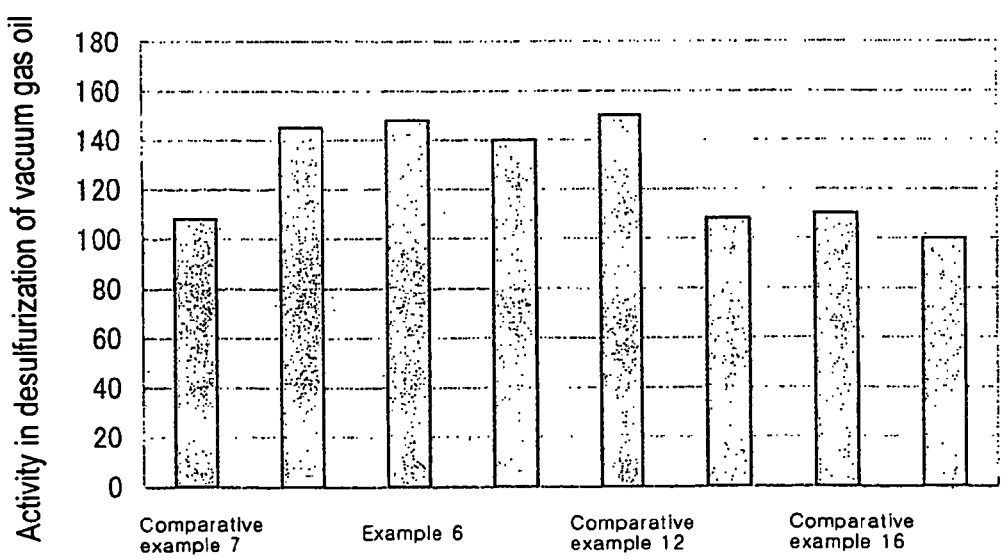
FIG. 15 is a graph showing the catalytic activity in the hydrodesulfurization test of vacuum gas oil (VGO).

The hydrodesulfurization of VGO was performed in a high-pressure flow type reactor under the following conditions: reaction pressure, 8 MPa; reaction temperature, 370° C.; liquid hourly space velocity, 2.0 hr$^{-1}$; ratio of hydrogen to feedstock, 400 Nl/l. The activity of each catalyst obtained in the test for hydrodesulfurization of VGO is graphically shown in FIG. 15 with the activity of the catalyst prepared from the specimen of Comparative Example 16 taken as 100.

It is seen from the results that the catalysts of this invention (prepared from the specimens of Examples) show activity comparable to that of titanium oxide alone of Comparative Example 16 and the properties inherent in titanium oxide are fully manifested. In Comparative Example 7, however, there is a shortage of titanium oxide to fully cover the alumina core and the desulfurization activity here does not differ very much from that of alumina alone.

(Test for Hydrodesulfurization of Gas Oil)

Figure 16:
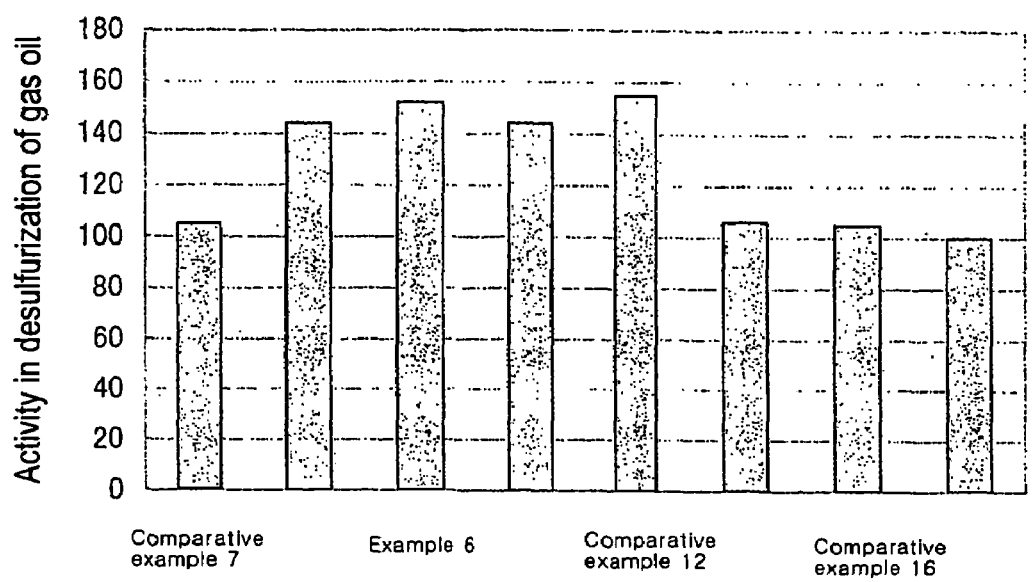
FIG. 16 is a graph showing the catalytic activity in the hydrodesulfurization test of gas oil.

The hydrodesulfurization of gas oil was performed in a high-pressure flow type reactor under the following conditions: reaction pressure, 5 MPa; reaction temperature, 360° C.; liquid hourly space velocity, 2.0 hr$^{-1}$; ratio of hydrogen to feedstock, 250 Nl/l. The catalysts submitted to the test were all treated for sulfidation in advance with gas oil whose sulfur content had been adjusted to 2.5% by addition of dimethyl disulfide. The activity of each catalyst obtained in the test for hydrodesulfurization of VGO is graphically shown in FIG. 16 with the activity of the catalyst prepared from the specimen of Comparative Example 11 taken as 100.

60%, titania increases in amount and tends to associate and become crystalline and there is the possibility of alumina not being covered satisfactorily.

INDUSTRIAL APPLICABILITY

The layered porous titanium oxide of this invention has a regulated pore structure, a large specific surface area, and excellent mechanical strength and performs excellently as a catalyst by itself or as a catalyst carrier and it is commercially useful for a variety of catalysts or catalyst carriers, for example, in hydrorefining, hydrogenation of CO, denitrification of waste gas, photocatalysis, and the like.

TABLE 3

| | Composition | Depositing operation | Titanium localization index (B/A) | Specific surface area (m$^2$/g) | Mechanical strength (SCS) (kg/mm) | X-ray diffraction | Raman spectroscopic analysis | Pore sharpness degree (%) | VGO-HDS Activity | GO-HDS Activity |
|---|---|---|---|---|---|---|---|---|---|---|
| Example 5 | 15%-TiO$_2$/Al$_2$O$_3$ | Between isoelectric points | 1.94 | 331 | 1.12 | Al | Amorphous | 80 | 145 | 144 |
| Example 6 | 20%-TiO$_2$/Al$_2$O$_3$ | | 2.83 | 348 | 1.1 | Al | Amorphous | 78 | 148 | 152 |
| Example 7 | 30%-TiO$_2$/Al$_2$O$_3$ | | 2.57 | 380 | 0.95 | Al | Amorphous | 79 | — | — |
| Example 8 | 40%-TiO$_2$/Al$_2$O$_3$ | | 2.28 | 338 | 0.75 | Al | Amorphous | 72 | — | — |
| Example 9 | 50%-TiO$_2$/Al$_2$O$_3$ | | 1.92 | 286 | 0.6 | Al | Amorphous | 66 | 140 | 144 |
| Example 10 | 60%-TiO$_2$/Al$_2$O$_3$ | | 1.64 | 249 | 0.5 | Al | Amorphous | 55 | — | — |
| Example 11 | 20%-TiO$_2$/SiO$_2$ | | 1.92 | 385 | 0.96 | Si | Amorphous | 75 | — | — |
| Comparative example 7 | 10%-TiO$_2$/Al$_2$O$_3$ | Between isoelectric points | 1.58 | 326 | 1.15 | Al | Amorphous | 80 | 108 | 105 |
| Comparative example 8 | 70%-TiO$_2$/Al$_2$O$_3$ | | 1.38 | 212 | 0.45 | Al + Ti | Anatase | 49 | — | — |
| Comparative example 9 | 80%-TiO$_2$/Al$_2$O$_3$ | | 1.23 | 189 | 0.35 | Al + Ti | Anatase | 48 | — | — |
| Comparative example 10 | 90%-TiO$_2$/Al$_2$O$_3$ | | 1.13 | 178 | 0.3 | Al + Ti | Anatase | 47 | — | — |
| Comparative example 11 | 100%-TiO$_2$ | — | 1.00 | 160 | 0.25 | Ti | Anatase | 63 | 150 | 160 |
| Comparative example 12 | 20%-TiO$_2$/Al$_2$O$_3$ | pH ≦ 6 | 1.15 | 258 | 1.1 | Al + Ti | Anatase | 52 | 108 | 106 |
| Comparative example 13 | 20%-TiO$_2$/Al$_2$O$_3$ | pH ≦ 6 PHS | 1.13 | 243 | 1.1 | Al + Ti | Anatase | 55 | — | — |
| Comparative example 14 | 20%-TiO$_2$/Al$_2$O$_3$ | pH ≧ 9 | 1.18 | 247 | 1.1 | Al + Ti | Anatase | 51 | — | — |
| Comparative example 15 | 20%-TiO$_2$/Al$_2$O$_3$ | Physical mixing | 1.08 | 274 | 0.8 | Al + Ti | Anatase | 32 | 110 | 105 |
| Comparative example 16 | 100%-Al$_2$O$_3$ | — | — | 320 | 1.2 | Al | — | 84 | 100 | 100 |

Note:
The proportion of TiO$_2$ in the composition denotes the amount of deposited TiO$_2$ VGO-HDS denotes the catalytic activity in the hydrodesulfurization of vacuum gas oil, and GO-HDS denotes the catalytic activity in the hydrodesulfurization of gas oil.

It is seen from the results that the catalysts of this invention (prepared from the specimens of Examples) show activity comparable to that of titanium oxide alone of Comparative Example 11 and the properties inherent in titanium oxide are fully manifested. In Comparative Example 7, however, there is a shortage of titanium oxide to fully cover the alumina core and the desulfurization activity here does not differ very much from that of alumina alone.

Figure 17:
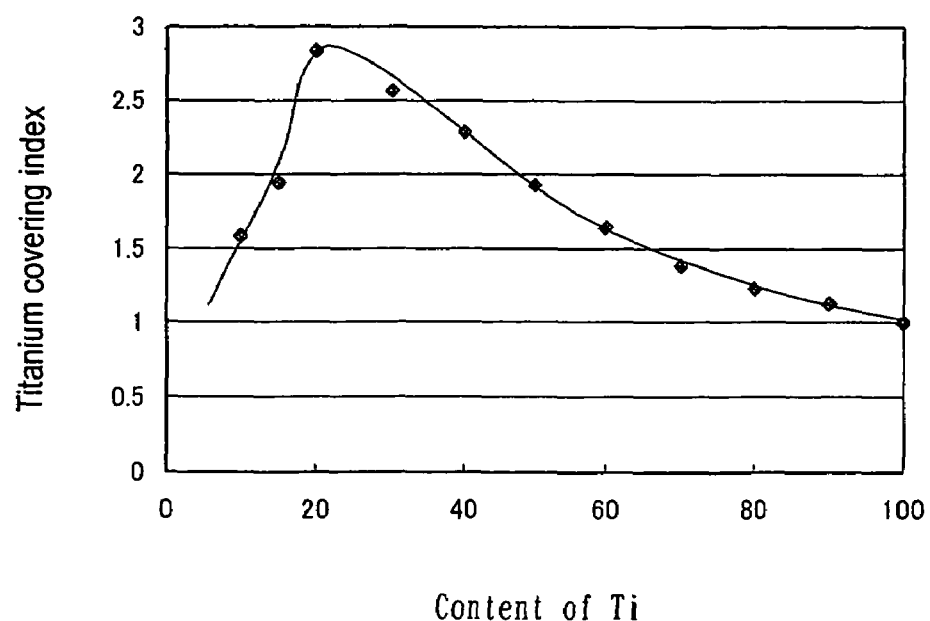
FIG. 17 is a graph showing the content of titania and the titania-localization index of the molded articles of alumina/titanium oxide prepared respectively in Examples 5-10 and Comparative Examples 7-11.

The titanium localization index defined in this invention is stipulated to be 1.6 or more and this means, as illustrated in FIG. 17, that the surface cannot be covered fully with titania when the Ti content is less than 10% while the proportion of alumina decreases with a concomitant drop in mechanical strength to below 0.5 kg/mm or below the strength required for practical use when the Ti content is more than 60% as shown in FIG. 14. Moreover, when the Ti content is more than

What is claimed is:

1. Layered porous titanium oxide comprising an inorganic oxide as a core and titanium oxide deposited on the surface of the inorganic oxide wherein the titanium localization index (B/A) represented by the ratio of the proportion of titanium (Ti) to the sum of the constituent metal (M) of the inorganic oxide and titanium (Ti) determined by X-ray photoelectron spectroscopy (XPS) [B=Ti XPS/(Ti XPS+M XPS)] to the bulk mixing molar ratio of titanium (Ti) to the sum of the constituent metal (M) of the inorganic oxide and titanium (Ti) [A=Ti/(Ti+M)] is 1.6 or more, the repeat distance between the crystal lattice planes of titanium oxide on the surface of the inorganic oxide is 50 Å or less, and the titanium oxide is deposited on the surface of the inorganic oxide so as to be chemically and/or microscopically united to the inorganic oxide.

2. Layered porous titanium oxide as described in claim 1 wherein the amount of deposited titanium oxide is 13-60 mass %.

3. Layered porous titanium oxide as described in claim 1 wherein the pore sharpness degree is 50% or more.

4. Layered porous titanium oxide as described in claim 1 wherein the pore volume is 0.3 mL/g or more.

5. Layered porous titanium oxide as described in claim 1 wherein the specific surface area is 100 m$^2$/g or more.

6. Layered porous titanium oxide as described in claim 1 wherein the inorganic oxide is a hydrosol, a hydrogel, a xerogel, a hydroxide, or a hydrated oxide and the titanium oxide is deposited on this organic oxide.

7. Layered porous titanium oxide as described in claim 1 wherein the inorganic oxide is synthesized by the pH swing operation.

8. Layered porous titanium oxide as described in claim 1 wherein the inorganic oxide is at least one selected from the group of alumina, silica, magnesia, silica/alumina, silica/titania, alumina/zirconia, silica/zirconia, and silica/magnesia.

9. Layered porous titanium oxide as described in claim 1 wherein the inorganic oxide is needle-shaped or column-shaped.

10. Layered porous titanium oxide as described in claim 1 wherein layered porous titanium oxide is obtained in the depositing step which comprises supplying a raw material titanium solution and a pH adjusting agent in the presence of an inorganic oxide and depositing titanium oxide on the surface of the inorganic oxide in the pH range between the isoelectric point of titanium oxide and that of the inorganic oxide.

11. Layered porous titanium oxide as described in claim 10 wherein the layered porous titanium oxide is obtained by the calcining treatment performed in the temperature range of 90-900° C. after the depositing step.

12. A catalyst comprising the layered porous titanium oxide described in claim 1.

13. A catalyst comprising the layered porous titanium oxide described in claim 1 as a carrier and a catalyst metal deposited on this carrier.

14. A catalyst comprising the layered porous titanium oxide described in claim 11 as a carrier and a catalyst metal deposited on this carrier.

15. A process for producing layered porous titanium oxide as described in claim 1 which comprises a depositing step for supplying a solution of titanium chloride, titanium sulfate, or titanyl sulfate in the presence of an inorganic oxide and a pH adjusting agent in the presence of an inorganic oxide and depositing titanium oxide on the surface of the inorganic oxide in the pH range between the isoelectric point of titanium oxide and that of the inorganic oxide.

16. A process for producing layered porous titanium oxide as described in claim 15 which comprises preparing a dispersion containing the inorganic oxide by the pH swing operation in the pH swing step before the depositing step for depositing titanium oxide on the surface of the inorganic oxide and supplying the dispersion as it is to the ensuing depositing step.

17. A process for producing layered porous titanium oxide as described in claim 15 which comprises a calcining step for performing a calcining treatment in the temperature range of 90-900° C. following the depositing step.

18. A process for producing layered porous titanium oxide as described in claim 15 which comprises letting a particle growth inhibitor exist in the reaction system in the step for depositing titanium oxide on the surface of the inorganic oxide, said particle growth inhibitor containing at least one element selected from the group of silicon, phosphorus, magnesium, calcium, barium, manganese, aluminum, and zirconium.

* * * * *